(12) United States Patent
Maniwa et al.

(10) Patent No.: US 9,417,817 B2
(45) Date of Patent: Aug. 16, 2016

(54) MANAGEMENT APPARATUS AND MANAGEMENT METHOD

(71) Applicant: Hitachi, Ltd., Tokyo (JP)

(72) Inventors: Naoshi Maniwa, Tokyo (JP); Takato Kusama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/399,324

(22) PCT Filed: Sep. 26, 2012

(86) PCT No.: PCT/JP2012/074702
§ 371 (c)(1),
(2) Date: Nov. 6, 2014

(87) PCT Pub. No.: WO2014/049718
PCT Pub. Date: Apr. 3, 2014

(65) Prior Publication Data
US 2015/0074299 A1    Mar. 12, 2015

(51) Int. Cl.
*G06F 13/12* (2006.01)
*G06F 3/06* (2006.01)
(Continued)

(52) U.S. Cl.
CPC .............. *G06F 3/0664* (2013.01); *G06F 3/06* (2013.01); *G06F 3/067* (2013.01); *G06F 3/0608* (2013.01); *G06F 3/0617* (2013.01);
(Continued)

(58) Field of Classification Search
None
See application file for complete search history.

(56) References Cited

U.S. PATENT DOCUMENTS 7,930,509 B2 * 4/2011 Eguchi ............ G06F 3/0608
711/112
8,151,033 B2 * 4/2012 Dake ............... G06F 3/06
711/112
2002/0156887 A1   10/2002 Hashimoto
(Continued)

FOREIGN PATENT DOCUMENTS

EP         2 026 188 A2    2/2009
JP       2002-312126 A    10/2002
(Continued)

OTHER PUBLICATIONS

PCT International Search Report and Written Opinion on application PCT/JP2012/074702 mailed Dec. 11, 2012; 10 pages (with English translation of Search Report).
(Continued)

*Primary Examiner* — Henry Tsai
*Assistant Examiner* — Juanito Borromeo
(74) *Attorney, Agent, or Firm* — Foley & Lardner LLP

(57) ABSTRACT

Computer system providing to a host computer a virtual logical volume that is associated with a logical pool configured from storage areas respectively provided by first and second storage apparatuses, and dynamically assigns a storage area from the logical volume to the virtual logical volume, a host computer and the first storage apparatus are connected via a first path configuring an access path, and, when a ratio of an access volume used by a second path connecting the first and second storage apparatuses exceeds a predetermined ratio, it is determined that a problem with the access path from the host computer to virtual logical volume, a third path connecting the host computer and the second storage apparatus is identified as a change destination of the access path, and the identified third path is changed to a part of the access path from the host computer to the virtual logical volume.

12 Claims, 30 Drawing Sheets

(51) Int. Cl.
*G06F 13/10* (2006.01)
*G06F 11/20* (2006.01)

(52) U.S. Cl.
CPC .......... *G06F 3/0635* (2013.01); *G06F 3/0665* (2013.01); *G06F 11/20* (2013.01); *G06F 13/10* (2013.01)

(56) References Cited

U.S. PATENT DOCUMENTS

| | | |
|---|---|---|
| 2004/0193827 A1 | 9/2004 | Mogi et al. |
| 2005/0188109 A1 | 8/2005 | Shiga et al. |
| 2007/0180087 A1* | 8/2007 | Mizote .................. G06F 9/5027 709/223 |
| 2008/0059697 A1 | 3/2008 | Sakaki et al. |
| 2009/0043959 A1 | 2/2009 | Yamamoto |
| 2011/0060885 A1 | 3/2011 | Satoyama et al. |
| 2012/0005427 A1 | 1/2012 | Kano et al. |

FOREIGN PATENT DOCUMENTS

| | | |
|---|---|---|
| JP | 2003-015915 A | 1/2003 |
| JP | 2003-167794 A | 6/2003 |
| JP | 2004-302751 A | 10/2004 |
| JP | 2005-217815 A | 8/2005 |
| JP | 2008-065561 A | 3/2008 |

OTHER PUBLICATIONS

European Patent Office extended search report on application 12885479.1 dated Nov. 27, 2015; 10 pages.

* cited by examiner

FIG. 7

| VIRTUAL LOGICAL VOLUME ID | HOST COMPUTER ID | HOST COMPUTER PORT ID | PHYSICAL STORAGE APPARATUS ID | PHYSICAL STORAGE APPARATUS PORT ID | LUN | ACCESS PATH INFORMATION |
|---|---|---|---|---|---|---|
| VVOL-1 | Host-1 | Host-Port-1 | Storage-1 | Storage-Port-1 | LUN-1 | true |
| VVOL-1 | Host-1 | Host-Port-2 | Storage-2 | Storage-Port-2 | LUN-1 | false |
| VVOL-2 | Host-1 | Host-Port-3 | Storage-3 | Storage-Port-3 | LUN-2 | false |
| ... | ... | ... | ... | ... | ... | ... |
| 70A | 70B | 70C | 70D | 70E | 70F | 70G |

| VIRTUAL LOGICAL VOLUME ID | HOST COMPUTER ID | TRAFFIC | CAPACITY |
|---|---|---|---|
| VVOL-1 | Host-1 | 10Mbps | 100GB |
| VVOL-2 | Host-1 | 20Mbps | 200GB |
| ... | ... | ... | ... |

| POOL ID | VIRTUAL LOGICAL VOLUME ID | LOGICAL PAGE ID | PHYSICAL STORAGE APPARATUS ID | TRAFFIC | CAPACITY | PHYSICAL STORAGE APPARATUS PORT ID |
|---|---|---|---|---|---|---|
| Pool-1 | VVOL-1 | Page-1 | Storage-1 | 0.1Mbps | 40MB | Storage-Port-1 |
| Pool-1 | VVOL-1 | Page-2 | Storage-2 | 0.2Mbps | 40MB | Storage-Port-2 |
| ... | ... | ... | ... | ... | ... | ... |
| 72A | 72B | 72C | 72D | 72E | 72F | 72G |

| PHYSICAL STORAGE APPARATUS ID | PHYSICAL STORAGE APPARATUS PORT ID | PORT NAME | RESIDUAL BAND WIDTH | BACK-END PORT INFORMATION |
|---|---|---|---|---|
| Storage-1 | Storage-Port-1 | CTL1-A | 3Gbps | false |
| Storage-2 | Storage-Port-2 | CTL2-A | 2Gbps | true |
| ... | ... | ... | ... | ... |
| 73A | 73B | 73C | 73D | 73E |

| PHYSICAL STORAGE APPARATUS ID-A | PHYSICAL STORAGE APPARATUS PORT ID-A | PHYSICAL STORAGE APPARATUS ID-B | PHYSICAL STORAGE APPARATUS PORT ID-B | INTER-PHYSICAL STORAGE APPARATUS PORT PAIR INFORMATION | ACCESS PATH INFORMATION | VIRTUAL LOGICAL VOLUME ID | HOST COMPUTER ID |
|---|---|---|---|---|---|---|---|
| Storage-1 | Storage-Port-1 | Storage-1 | Storage-Port-20 | false | true | VVOL-1 | Host-1 |
| Storage-2 | Storage-Port-20 | Storage-3 | Storage-Port-30 | true | false | VVOL-3 | Host-1 |
| ... | ... | ... | ... | ... | ... | ... | ... |
| 74A | 74B | 74C | 74D | 74E | 74F | 74G | 74H |

| PHYSICAL STORAGE APPARATUS ID | TOTAL TRAFFIC | TRAFFIC RATIO | ACCESS PATH INFORMATION |
|---|---|---|---|
| Storage-1 | 1Gbps | 10% | true |
| Storage-2 | 2Gbps | 20% | false |
| Storage-3 | 7Gbps | 70% | false |

| PHYSICAL STORAGE APPARATUS ID | PHYSICAL STORAGE APPARATUS PORT ID | PORT NAME | RESIDUAL BANDWIDTH | BACK-END PORT INFORMATION |
|---|---|---|---|---|
| Storage-1 | Storage-Port-1 | CTL1-A | 6Gbps | false |
| Storage-2 | Storage-Port-2 | CTL2-A | 4Gbps | true |
| ... | ... | ... | ... | ... |
| 78A | 78B | 78C | 78D | 78E |

| PHYSICAL STORAGE APPARATUS ID | PHYSICAL STORAGE APPARATUS PORT ID | PORT NAME | RESIDUAL BANDWIDTH |
|---|---|---|---|
| Storage-1 | Storage-Port-1 | CTL1-A | 6Gbps |
| Storage-1 | Storage-Port-100 | CTL2-A | 4Gbps |
| ... | ... | ... | ... |
| 79A | 79B | 79C | 79D |

| PHYSICAL STORAGE APPARATUS ID | PHYSICAL STORAGE APPARATUS PORT ID | PORT NAME | RESIDUAL BANDWIDTH | HOST COMPUTER ID | VIRTUAL LOGICAL VOLUME ID |
|---|---|---|---|---|---|
| Storage-1 | Storage-Port-1 | CTL1-A | 6Gbps | Host-1 | VVOL-1 |
| Storage-1 | Storage-Port-100 | CTL2-A | 4Gbps | Host-1 | VVOL-2 |
| ... | ... | ... | ... | ... | ... |
| 80A | 80B | 80C | 80D | 80E | 80F |

| PHYSICAL STORAGE APPARATUS ID-A | PHYSICAL STORAGE APPARATUS PORT ID-A | PHYSICAL STORAGE APPARATUS ID-B | PHYSICAL STORAGE APPARATUS PORT ID-B | HOST COMPUTER ID | VIRTUAL LOGICAL VOLUME ID |
|---|---|---|---|---|---|
| Storage-1 | Storage-Port-1 | Storage-2 | Storage-Port-20 | Host-1 | VVOL-1 |
| Storage-2 | Storage-Port-20 | Storage-3 | Storage-Port-30 | Host-1 | VVOL-1 |
| ... | ... | ... | ... | ... | ... |
| 81A | 81B | 81C | 81D | 81E | 81F |

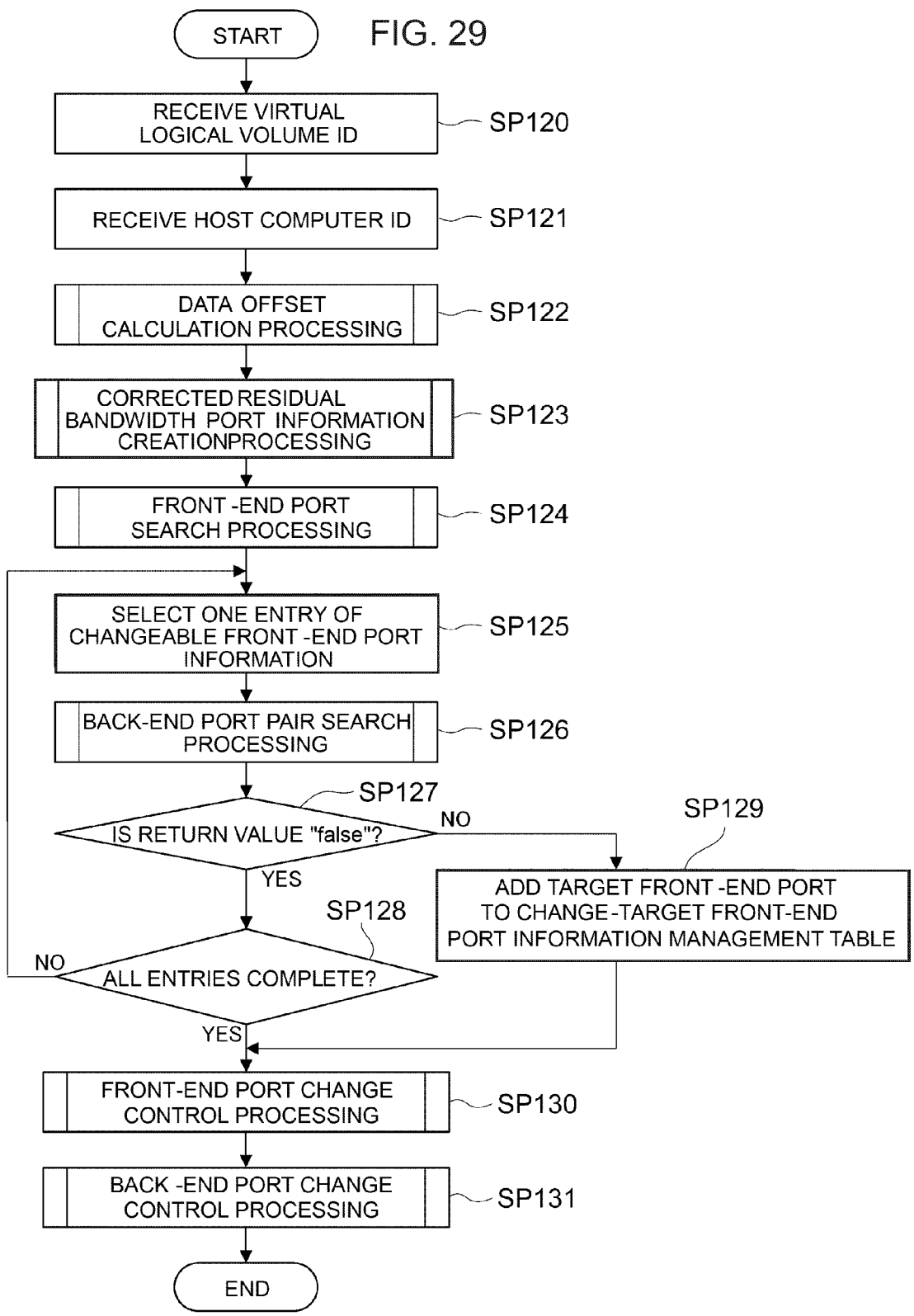

MANAGEMENT APPARATUS AND MANAGEMENT METHOD

TECHNICAL FIELD

The present invention relates to a management apparatus and a management method, and can be suitably applied to a management computer for managing the performance of a computer that manages storage areas respectively provided by a plurality of storage apparatuses as a logical pool that extends over the plurality of storage apparatuses, provides to a host computer a virtual volume that is associated with the logical pool, and dynamically assigns a storage area from the logical pool to the virtual volume.

BACKGROUND ART

In recent years, various technologies are being proposed as technologies related to a storage apparatus. For example, PTL 1 discloses the Thin Provisioning technology of applying a virtual logical volume (this is hereinafter referred to as the "virtual logical volume") to a host computer, and dynamically assigning a physical storage area from a storage apparatus to that virtual logical volume according to the writing status of data from the host computer into the virtual logical volume.

Moreover, PTL 2 discloses technology where a storage apparatus that received an I/O request determines whether that I/O request is a request for writing or reading data into or from a storage area in the own storage apparatus, and, if the I/O request is a request for writing or reading data into or from a storage area in another storage apparatus, transfers that I/O request to the other storage apparatus.

In addition, PTL 3 discloses technology of enabling the integration of pools in different storage apparatuses by incorporating a storage area of a pool existing in another storage apparatus into a storage area that is being used by a pool created in a storage apparatus.

Meanwhile, PTL 4 discloses technology of diagnosing whether an access path from a host computer to a storage apparatus is optimal. According to this technology, it is possible to display the optimal access path from the host computer to the storage apparatus, or switch the path from the host computer to the storage apparatus to be the optimal access path.

CITATION LIST

Patent Literature

[PTL 1]
Japanese Patent Application Publication No. 2003-15915
[PTL 2]
Japanese Patent Application Publication No. 2008-65561
[PTL 3]
Specification of U.S. Patent Application Publication No. 2011/60885
[PTL 4]
Japanese Patent Application Publication No. 2003-167794

SUMMARY OF INVENTION

Technical Problem

As a result of combining the technologies disclosed in PTL 1 to PTL 3 described above, it is possible to configure a computer system that distributively arranges storage areas of one virtual logical volume in a plurality of storage apparatuses, and, when an I/O request from a host computer is not for the own storage apparatus, transfers that I/O request to the corresponding storage apparatus.

In the foregoing case, with this kind of computer system, when there is no storage area to become an I/O destination in the storage apparatus that is connected to the host computer via the access path when the host computer accesses the virtual logical volume, since the I/O request will be transferred to the corresponding storage apparatus, there is a problem in that the access speed from the host computer to that storage area will deteriorate by that much.

Accordingly, in the foregoing computer system, if it is possible to identify the optimal path as the access path to be used by the host computer upon accessing the virtual logical volume while giving consideration to the transfer of I/O requests and data between the storage apparatuses, and change the access path to the identified path, it should be possible to increase the access speed, and improve the access performance from the host computer in the computer system to the data stored in the virtual logical volume.

The present invention was devised in view of the foregoing points, and an object of this invention is to propose a management apparatus and a management method capable of improving the access performance of accessing data.

Solution to Problem

In order to achieve the foregoing object, the present invention provides a management apparatus for managing a computer system in which a plurality of storage apparatuses are connected to each other, wherewith the computer system manages storage areas respectively provided by a first storage apparatus and a second storage apparatus included in the plurality of storage apparatuses as a logical pool that extends over the plurality of storage apparatuses, provides to a host computer a virtual logical volume that is associated with the logical pool, and dynamically assigns a storage area from the logical volume to the virtual logical volume according to usage of the virtual logical volume. The host computer is connected to the first storage apparatus via a first path, and accesses the virtual logical volume via the first path, and accesses the first storage apparatus when access-target data exists in the first storage apparatus, and accesses the second storage apparatus via a second path connecting the first storage apparatus and the second storage apparatus when access-target data exists in the second storage apparatus. The host computer comprises an access path diagnostic unit that determines whether a ratio of an access volume used by the second path exceeds a predetermined ratio, and determines that there is a problem with the access path from the host computer to the virtual logical volume when the ratio of the access volume exceeds the predetermined ratio, a change destination path identification unit that identifies a third path connecting the host computer and the second storage apparatus as a change destination of the access path when it is determined that there is a problem with the access path, and an access path change unit that executes predetermined control processing for changing the third path identified by the change destination path identification unit to be a part of the access path from the host computer to the virtual logical volume in substitute for the first path.

The present invention additionally provides a management method that is executed in a management apparatus for managing a computer system in which a plurality of storage apparatuses are connected to each other, wherewith the computer system manages storage areas respectively provided by a first storage apparatus and a second storage apparatus included in the plurality of storage apparatuses as a logical pool that extends over the plurality of storage apparatuses, provides to a host computer a virtual logical volume that is associated with the logical pool, and dynamically assigns a storage area from the logical volume to the virtual logical volume according to usage of the virtual logical volume. The host computer is connected to the first storage apparatus via a first path, and accesses the virtual logical volume via the first path, and accesses the first storage apparatus when access-target data exists in the first storage apparatus, and accesses the second storage apparatus via a second path connecting the first storage apparatus and the second storage apparatus when access-target data exists in the second storage apparatus. The host computer comprises a first step of the management apparatus determining whether a ratio of an access volume used by the second path exceeds a predetermined ratio, a second step of the management apparatus determining that there is a problem with the access path from the host computer to the virtual logical volume when the ratio of the access volume exceeds the predetermined ratio, and identifying a third path connecting the host computer and the second storage apparatus as a change destination of the access path, and a third step of the management apparatus executing predetermined control processing for changing the identified third path identified to be a part of the access path from the host computer to the virtual logical volume in substitute for the first path.

Since the computer system to which is applied the management apparatus or the management method according to the present invention can change the access path to further reduce the data transfer between storage apparatuses, it is possible to effectively prevent deterioration in the access speed from the host computer to the virtual logical volume caused by the data transfer between storage apparatuses.

Advantageous Effects of Invention

According to the present invention, it is possible to realize a management apparatus and a management method capable of improving the access performance of accessing data.

BRIEF DESCRIPTION OF DRAWINGS

FIG. 7 is a conceptual diagram explaining the path management table.

FIG. 8 is a conceptual diagram explaining the virtual logical volume management table.

FIG. 9 is a conceptual diagram explaining the page management table.

FIG. 10 is a conceptual diagram explaining the port management table.

FIG. 11 is a conceptual diagram explaining the port pair management table.

FIG. 12 is a conceptual diagram explaining the data offset information.

FIG. 13 is a conceptual diagram explaining the corrected residual bandwidth port information.

FIG. 14 is a conceptual diagram explaining the changeable front-end port information.

FIG. 15 is a conceptual diagram explaining the change-target front-end port information.

FIG. 16 is a conceptual diagram explaining the change-target back-end port pair information.

FIG. 29 is a flowchart showing the processing routine of the access path change processing.

DESCRIPTION OF EMBODIMENTS

An embodiment of the present invention is now explained in detail with reference to the drawings.

(1) Configuration of Computer System According to this Embodiment

Figure 1:
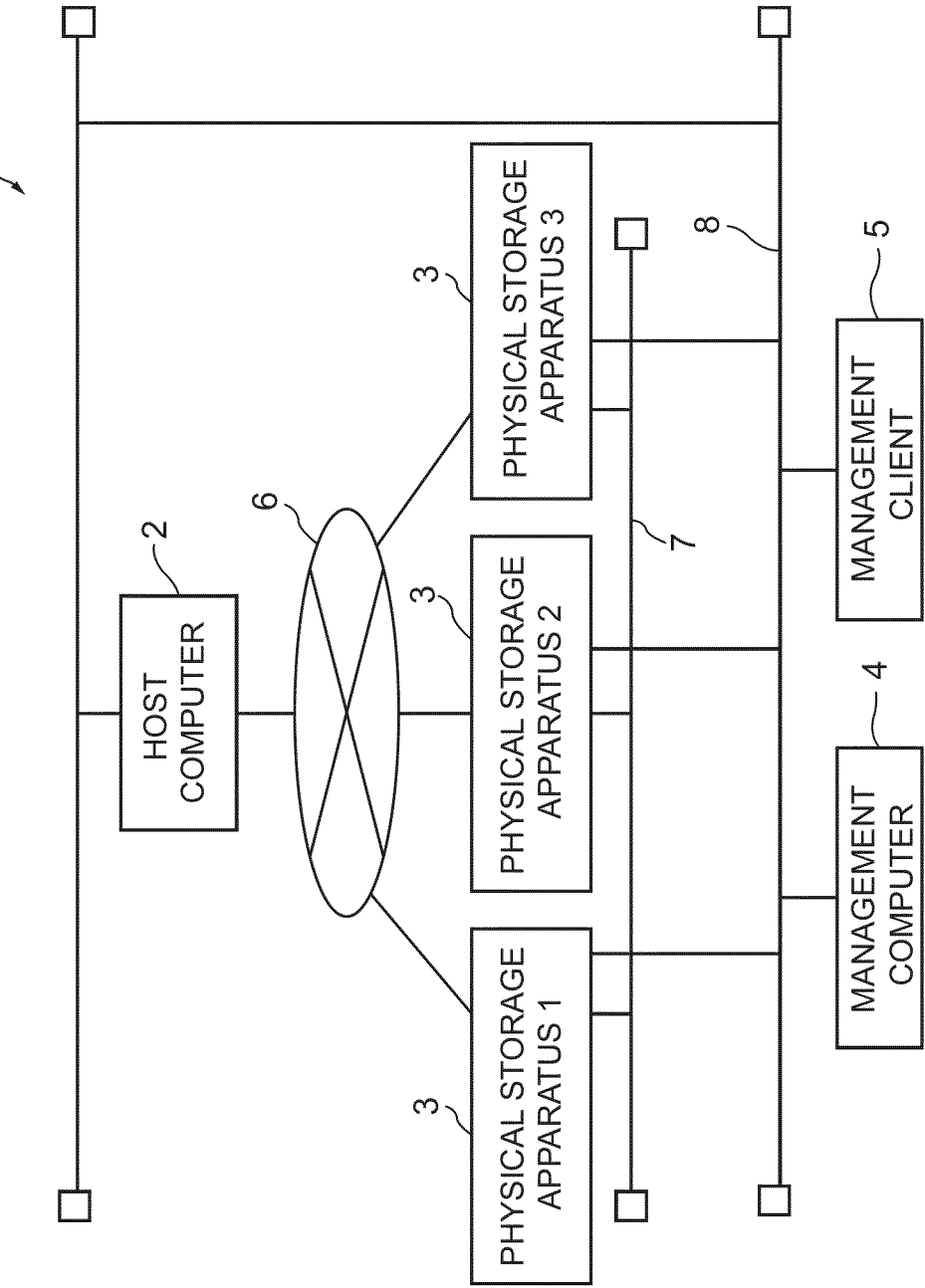
FIG. 1 is a block diagram showing the overall configuration of the computer system according to this embodiment.

FIG. 1 shows the overall computer system 1 according to this embodiment. The computer system 1 is configured by comprising a host computer 2, a plurality of physical storage apparatuses 3, a management computer 4 and a management client 5. The host computer 2 and the plurality of physical storage apparatuses 3 are connected via a host communication network 6, and the physical storage apparatuses 3 are connected to each other via an inter-apparatus communication network 7. Moreover, the host computer 2, the plurality of physical storage apparatuses 3, the management computer 4 and the management client 5 are connected via a management network 8.

The host communication network 6 is configured from a SAN (Storage Area Network). The host computer 2 sends and receives various commands such as I/O requests and various types of data to and from the physical storage apparatuses 3 via the host communication network 6. The inter-apparatus communication network 7 is also configured from a SAN. Each physical storage apparatus 3 transfers I/O requests from the host computer 2 to other physical storage apparatuses 3 and sends and receives data to and from the other physical storage apparatuses 3 via the inter-apparatus communication network 7. Note that the host communication network 6 and the inter-apparatus communication network 7 may be separate networks as shown in FIG. 1, or the same network.

The management network 8 is configured from a LAN (Local Area Network). The management computer 4 collects information from the host computer 2 and the respective physical storage apparatuses 3 via the management network 8, and configures various types of settings in the host computer 2 and the respective physical storage apparatuses 3. Moreover, the management computer 4 communicates with the management client 5 via the management network 8.

Figure 2:
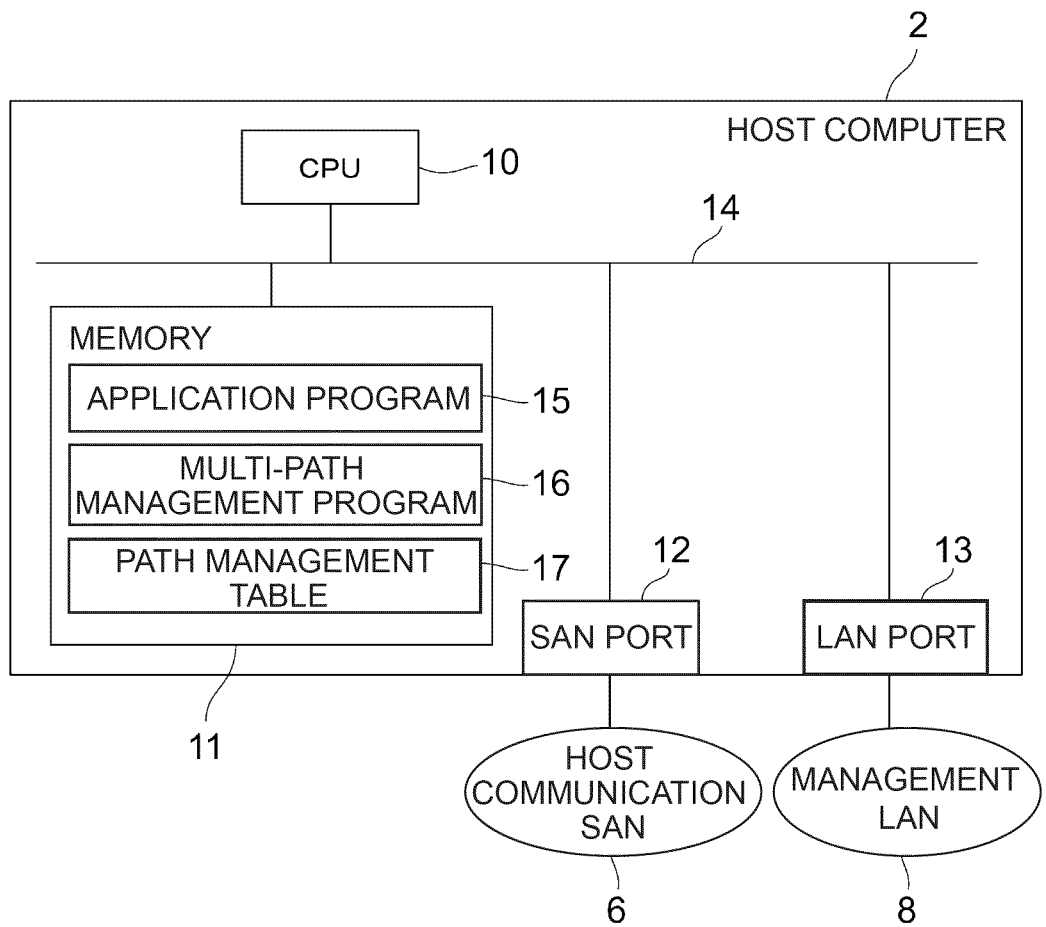
FIG. 2 is a block diagram showing the schematic configuration of the host computer.

FIG. 2 shows the schematic configuration of the host computer 2. The host computer 2 is configured by comprising a CPU (Central Processing Unit) 10, a memory 11, one or more SAN ports 12 and LAN ports 13, and an internal bus 14 that mutually connects the CPU 10, the memory 11, the SAN port 12 and the LAN port 13.

The CPU 10 is a processor that governs the operational control of the overall host computer 2. The memory 11 is used for retaining various programs and various types of data. The memory 11 stores one or more application programs 15, a multi-path management program 16 that manages a plurality of paths connecting the host computer 2 and the respective physical storage apparatuses 3, and a path management table 17 that is used for the managing the foregoing paths.

The SAN port 12 is a port to the host communication network 6, and a unique network address (for instance, a WWN (World Wide Name)) is assigned thereto on the host communication network 6. Moreover, the LAN port 13 is a port to the management network 8, and a unique network address (for instance, an IP (Internet Protocol) address) is assigned thereto on the management network 8.

Figure 3:
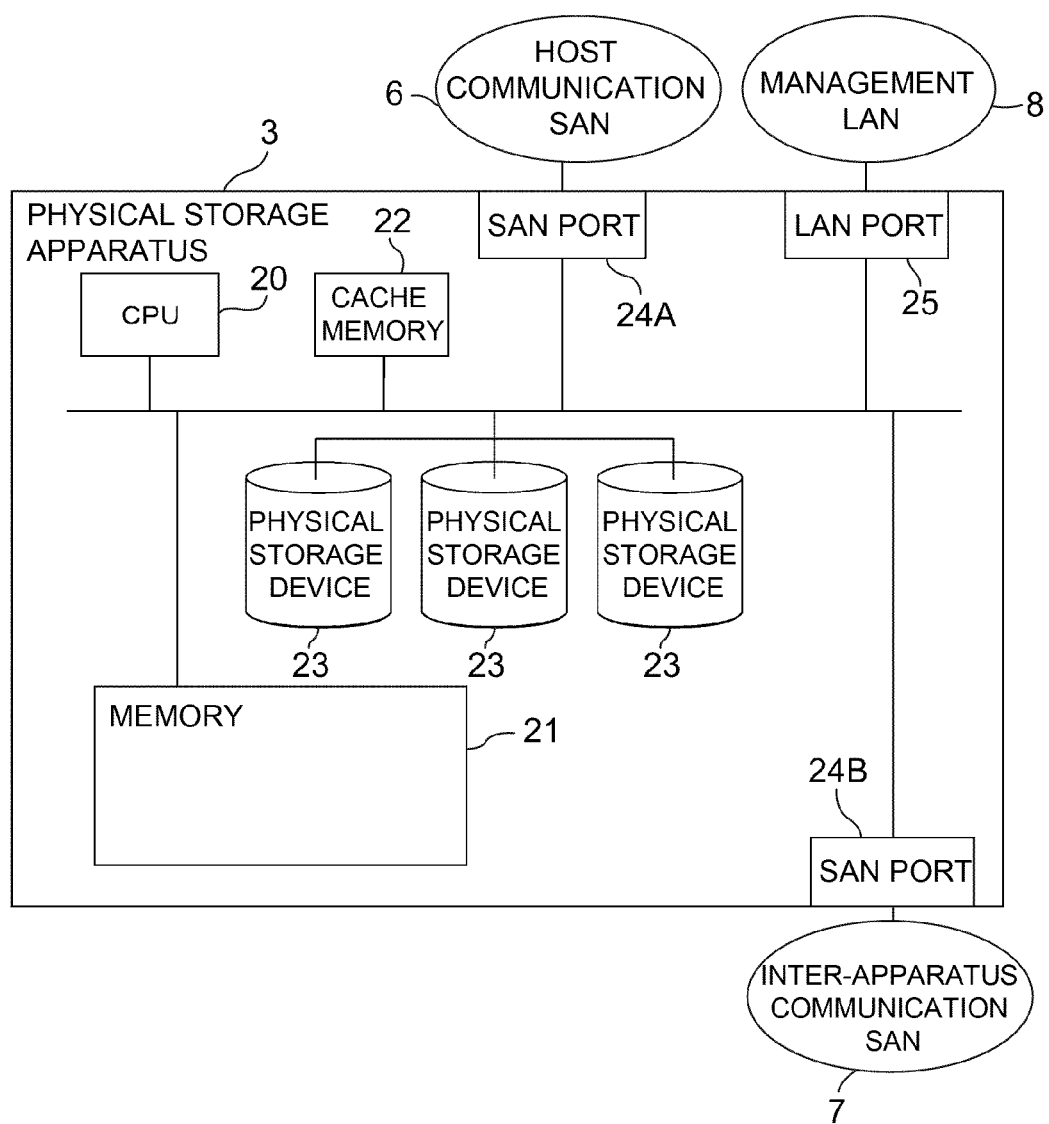
FIG. 3 is a block diagram showing the schematic configuration of the physical storage apparatus.

FIG. 3 shows the internal configuration of the physical storage apparatus 3. The physical storage apparatus 3 comprises a CPU 20, a memory 21, a cache memory 22, one or more physical storage devices 23, first and second SAN ports 24A, 24B, and a LAN port 25, and these components are connected to each other via an internal bus 26.

The CPU 20 is a processor that governs the operational control of the overall physical storage apparatus 3, reads the programs stored in the physical storage devices 23 into the memory 21, and executes the read programs as needed.

The memory 21 is used for storing the various programs that were read from the physical storage devices 23, and is additionally used as a work memory of the CPU 20. The cache memory 22 is mainly used for temporarily storing data to be read from or written into the physical storage devices 23.

The first SAN port 24A is a port to the host communication network 6, and the second SAN port 24B is a port to the inter-apparatus communication network 7. In addition, the LAN port 25 is a port to the management network 8. A unique identifier (for instance, a WWN or an IP address) is assigned to these ports on the respective networks. Note that, in the ensuing explanation, the first SAN port 24A is referred to as the front-end port 24A and the second SAN port is referred to as the back-end port 24B as appropriate.

The physical storage device 23 is configured, for example, from an expensive disk device configured from SCSI (Small Computer System Interface) disks, or an inexpensive disk device configured from SATA (Serial AT Attachment) disks or optical disks. One or more logical volumes VOL (refer to FIG. 5) are respectively set on the storage areas provided by the physical storage devices 23.

Note that the physical storage devices 23 may be replaced with a RAID (Redundant Arrays of Inexpensive Disks) group. A RAID group refers to an aggregate of a plurality of storage devices having the same type of physical characteristics such as the rotating speed of disks. Here, the CPU 20 manages the storage areas provided by the plurality of physical storage devices 23 configuring one RAID group as a storage area provided by one logical storage device, and sets one or more logical volumes VOL in that storage area.

Figure 4:
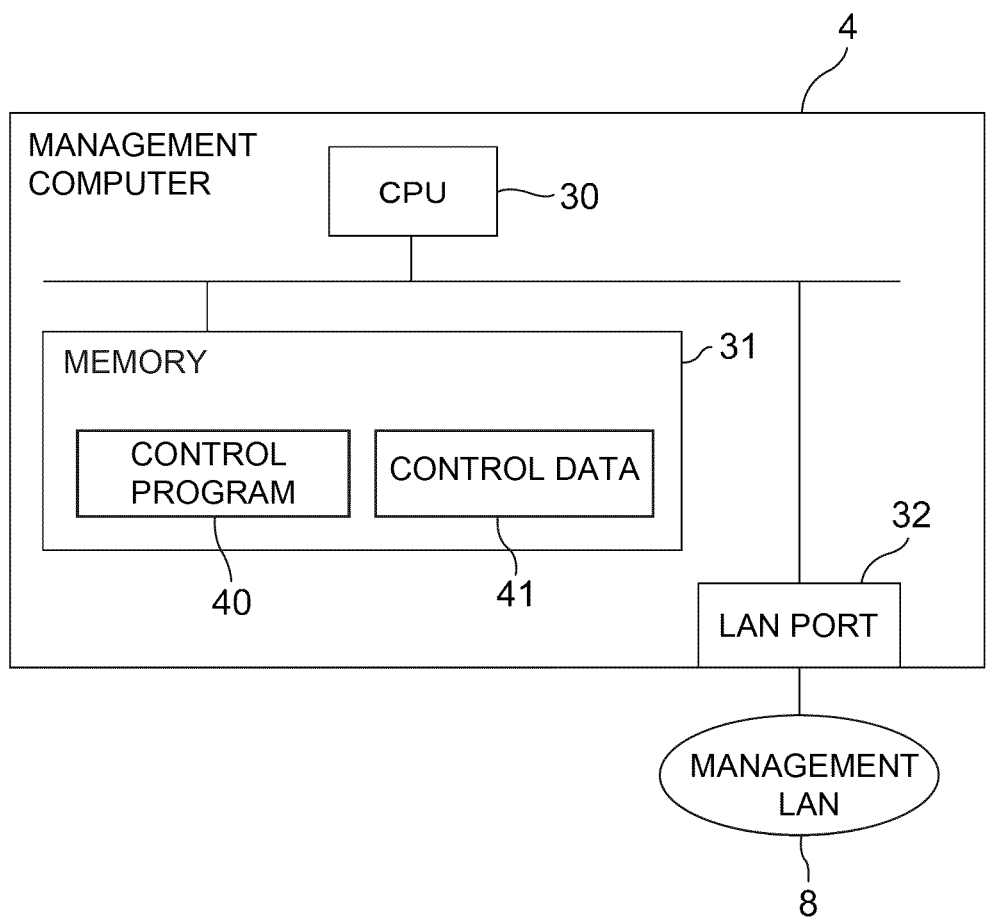
FIG. 4 is a block diagram showing the schematic configuration of the management computer.

FIG. 4 shows the schematic configuration of the management computer 4. The management computer 4 is configured by comprising a CPU 30, a memory 31 and a LAN port 32.

The CPU 30 is a processor that governs the operational control of the overall management computer 4. Moreover, the memory 31 is mainly used for storing various programs and various types of data. The control program 40 and the control data 41 described later are also stored and retained in the memory 31. As a result of the CPU 30 executing the control program 40 stored in the memory 31, the various types of processing described later are executed by the overall management computer 4. The LAN port 32 is a port to the management network 8, and a unique (for instance, an IP address) is assigned thereto on the management network 8.

The management client 5 is a computer device that is used by a system administrator, and is configured, for example, from a personal computer, a workstation, a mainframe or the like. The management client 5 comprises a display device configured from a liquid crystal panel or the like, and a mouse and/or a keyboard.

Figure 5:
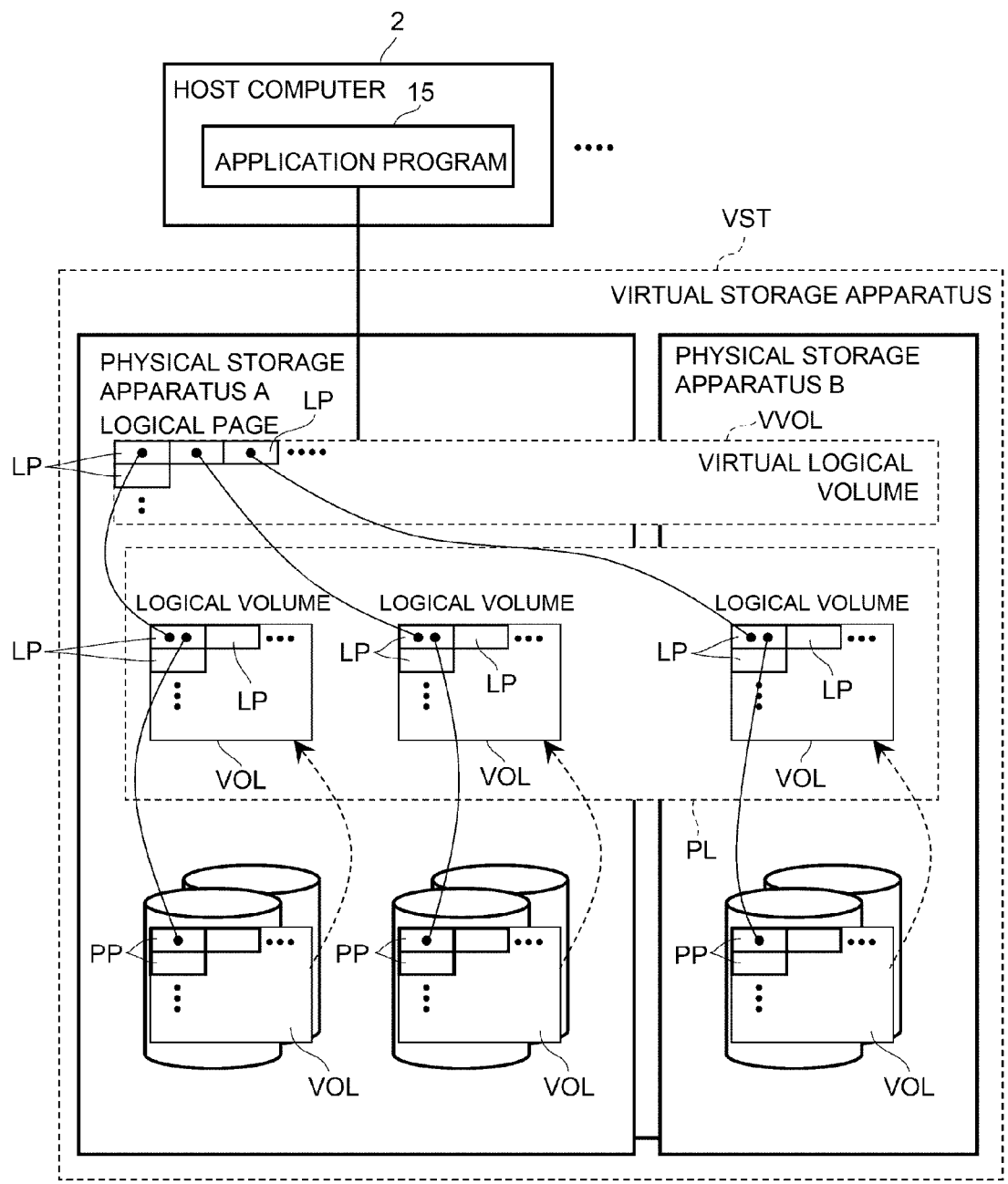
FIG. 5 is a conceptual diagram showing the logical configuration of the computer system.

FIG. 5 shows the logical configuration of the computer system 1. In the computer system 1, one virtual storage apparatus VST is constructed from a plurality of physical storage apparatuses 3 that are connected via the inter-apparatus communication network 7.

In the virtual storage apparatus VST, logical volumes VOL are created in the storage areas respectively provided by the physical storage devices 23 in each of the physical storage apparatuses 3 as described above, and these logical volumes VOL are managed as one logical pool (apparatus transverse pool) PL that extends over the physical storage apparatuses 3. Moreover, one or more virtual logical volumes VVOL that extend over the plurality of physical storage apparatuses 3 configuring the virtual storage apparatus VST are created in that virtual storage apparatus VST, and the virtual logical volume VVOL is provided to the host computer 2.

The host computer 2 recognizes the plurality of physical storage apparatuses 3 that are connected via the inter-apparatus communication network 7 as one virtual storage apparatus VST, and recognizes the virtual logical volume VVOL as a logical volume that is provided by that virtual storage apparatus VST. Here, the host computer 2 selects, as the access path, one path among a plurality of paths that are set to and from the plurality of physical storage apparatuses 3 configuring the virtual storage apparatus VST. The host computer 2 thereafter sends and receives read requests and write requests for reading and writing data from and to the virtual logical volume VVOL, as well as data to be read or written, based on the read requests and write requests, to and from a specific physical storage apparatus 3 via the access path.

On the side of the virtual storage apparatus VST, when a write request for writing data into the virtual logical volume VVOL is received from the host computer 2, a logical storage area (this is hereinafter referred to as the "logical page") LP of a predetermined size is assigned from one of the logical volumes VOL configuring the apparatus transverse pool PL. The logical page LP is associated with a physical storage area (this is hereinafter referred to as the "physical page") PP of a predetermined size in the physical storage apparatus 3 where that logical volume VOL exists. The physical page PP is assigned to the virtual logical volume VVOL as required according to the size of the write-target data, and the target data is stored in the physical page PP.

When a physical page PP is assigned to a physical storage apparatus 3 that is directly connected to the host computer 2 via the foregoing access path in response to the write request from the host computer 2, the target data is stored in that physical page PP. Meanwhile, when a physical page PP is assigned to a physical storage apparatus 3 that is not directly connected to the host computer 2 via the access path, the write request is transferred, via the inter-apparatus communication network 7, from the physical storage apparatus 3 to which the access path is connected, to the physical storage apparatus 3 to which the physical page PP was assigned, and stored in the physical page PP.

When the read-target data exists in a physical storage apparatus 3 to which the access path is not directly connected from the host computer 2, the read request is transferred from the physical storage apparatus 3 in which the host computer 2 and the access path are directly connected to the physical storage apparatus 3 containing the target data via the inter-apparatus communication network 7. Subsequently, in accordance with the read request, the read-target data that was read from that physical storage apparatus 3 is transferred, via the inter-apparatus communication network 7, to the physical storage apparatus 3 in which the host computer 2 and the access path are directly connected, and the data is sent to the host computer 2 as the source of the read request via the foregoing access path.

In addition, with the computer system 1, the management computer 4 is equipped with a hierarchical data management function of controlling the respective physical storage apparatuses configuring the virtual storage apparatus VST so as to migrate data of high access frequency to the physical storage apparatus 3 to which the access path to and from the host computer 2 is connected, and migrating data of low access frequency to the physical storage apparatus 3 to which the access path to and from the host computer 2 is not connected.

The management computer 4 constantly monitors the access frequency to the data retained by the respective physical storage apparatuses 3, and, when the access frequency to the data retained by the physical storage apparatus 3 to which the access path to and from the host computer 2 is not connected exceeds a predetermined threshold, the management computer 4 controls that physical storage apparatus to migrate the data to the physical storage apparatus 3 to which the access path to and from the host computer 2 is connected, and, when the access frequency to the data retained by the physical storage apparatus 3 to which the access path to and from the host computer 2 is not connected is less than a predetermined threshold, the management computer 4 controls that physical storage apparatus to which the access path to and from the host computer 2 is connected to migrate the data to another physical storage apparatus 3.

Accordingly, in the computer system 1, the response performance to an I/O request from the host computer 2 is improved while reducing the generation of data transfer between the physical storage apparatuses 3.

(2) Configuration of Control Programs and Control Data

Figure 6:
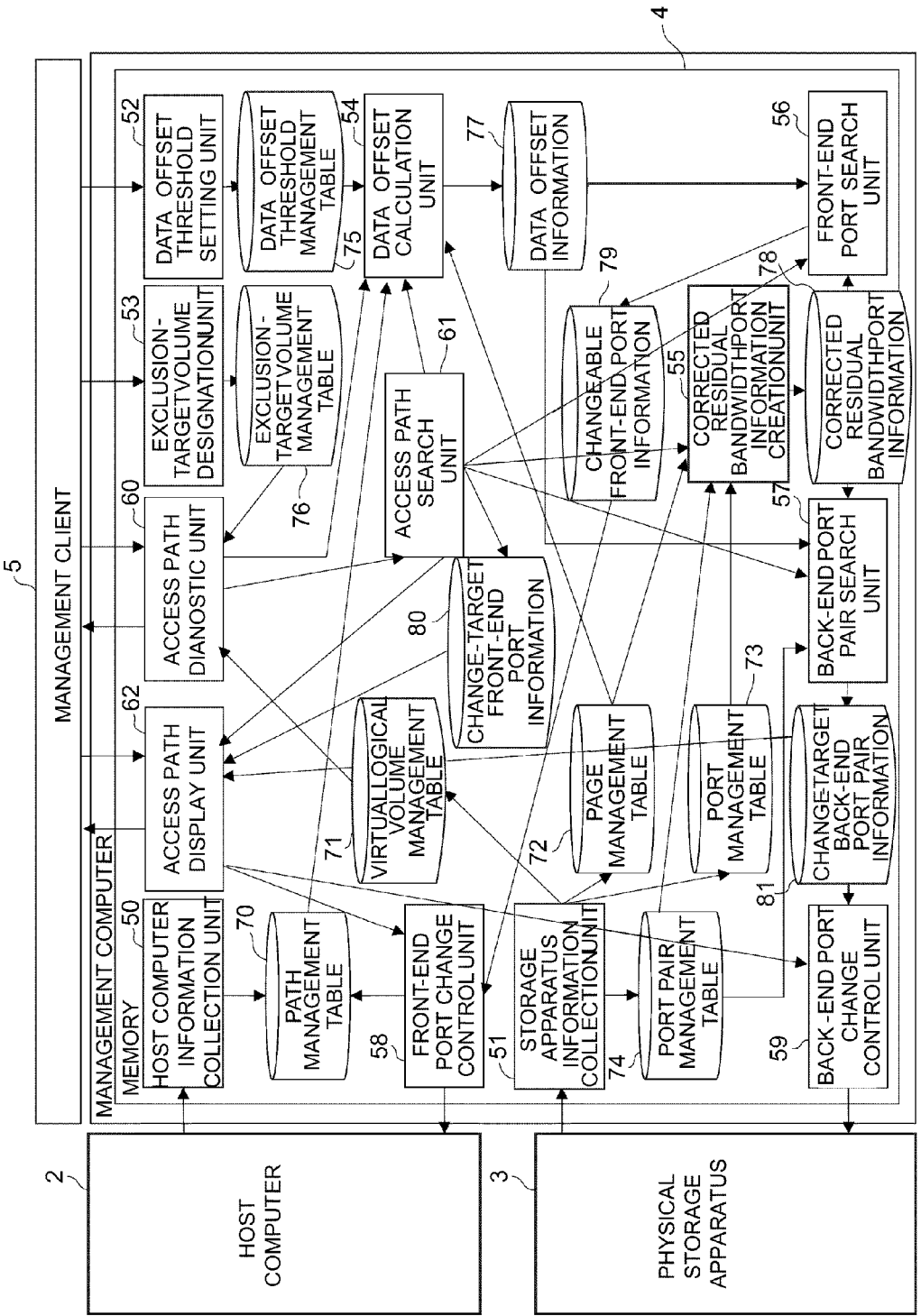
FIG. 6 is a block diagram explaining the control programs and control data of the management computer.

FIG. 6 shows the detailed configuration of the foregoing control program 40 (FIG. 4) and control data 41 (FIG. 4) stored in the memory 31 of the management computer 4. In FIG. 6, the respective rectangular shapes represent the program modules each configuring the control program 40, and the respective cylindrical shapes represent the management table or information each configuring the control data 41.

As evident from FIG. 6, the control program 40 is configured from a host computer information collection unit 50, a storage apparatus information collection unit 51, a data offset threshold setting unit 52, an exclusion-target volume designation unit 53, a data offset calculation unit 54, a corrected residual bandwidth port information creation unit 55, a front-end port search unit 56, a back-end port pair search unit 57, a front-end port change control unit 58, a back-end port change control unit 59, an access path diagnostic unit 60, an access path search unit 61 and an access path display unit 62.

Moreover, the control data 41 is configured from a path management table 70, a virtual logical volume management table 71, a page management table 72, a port management table 73, a port pair management table 74, a data offset threshold management table 75, an exclusion-target volume management table 76, data offset information 77, corrected residual bandwidth port information 78, changeable front-end port information 79, change-target front-end port information 80 and change-target back-end port pair information 81.

The host computer information collection unit 50 is activated at a predetermined timing (for instance, periodically by a timer according to a scheduling setting), or activated based on a request from the management client 5, and collects information related to the paths between the host computer 2 and the respective physical storage apparatuses 3 from that host computer 2, and stores the collected information in the path management table 70.

The storage apparatus information collection unit 51 is activated at a predetermined timing (for instance, periodically by a timer according to a scheduling setting), or activated based on a request from the management client 5, and collects information related to the respective virtual logical volumes VVOL created in the virtual storage apparatus VST (this is hereinafter referred to as the "virtual logical volume information") from the respective physical storage apparatuses 3, and stores the collected virtual logical volume information in the virtual logical volume management table 71.

Moreover, the storage apparatus information collection unit 51 collects, from the respective physical storage apparatuses 3, information related to the respective logical pages LP in the respective virtual logical volumes VVOL (this is hereinafter referred to as the "page information"), information related to the port of that physical storage apparatus 3 (this is hereinafter referred to as the "port information"), and information related to the paths between the physical storage apparatuses 3 (this is hereinafter referred to as the "port pair information"). Subsequently, the storage apparatus information collection unit 51 stores the collected page information in the page management table 72, stores the collected port information in the port management table 73, and stores the collected port pair information in the port pair management table 74.

The data offset threshold setting unit 52 acquires the data offset threshold and the unused port bandwidth threshold which were set by the system administrator by using the management client 5, from that management client 5, and stores the acquired data offset threshold and unused port bandwidth threshold in the data offset threshold management table 75.

Here, "data offset threshold" refers to the lower limit value of the ratio of the data volume stored in the physical storage apparatus 3 that is directly connected to the host computer 2 via the access path relative to the total data volume stored in one virtual logical volume VVOL. As described later, when the ratio of the data volume stored in the physical storage apparatus 3 that is directly connected to the host computer 2 via the access path is less than the data offset threshold, it is considered that the data stored in the corresponding virtual logical volume VVOL is being distributed to physical storage apparatuses 3 other than that physical storage apparatus 3. Thus, it is determined that there is a problem with the currently set access path from the host computer 2 to the virtual logical volume VVOL.

Moreover, "unused port bandwidth threshold" refers to the lower limit value of the unused bandwidth of the respective ports in the physical storage apparatus 3. As described later, when the residual bandwidth of the ports in the physical storage apparatus 3 is less than the unused port bandwidth threshold, it is determined that there is a problem with the currently set access path from the host computer 2 to the virtual logical volume VVOL.

The exclusion-target volume designation unit 53 acquires, from the management client 5, the identifier (virtual logical volume ID) of the virtual logical volume (this is hereinafter referred to as the "exclusion-target volume") VVOL to be excluded from the access path diagnosis processing (FIG. 20) and the access path automatic change processing (FIG. 27) described later which were set by the system administrator by using the management client 5, and stores the acquired virtual logical volume ID of the exclusion-target volume VVOL in the exclusion-target volume management table 76.

The data offset calculation unit 54 detects the offset status of distribution of the data stored in the target virtual logical volume VVOL to the respective physical storage apparatuses 3 based on the path information stored in the path management table 70 and the page information stored in the page management table 72, and generates the data offset information 77 representing that offset status.

The corrected residual bandwidth port information creation unit 55 generates the corrected residual bandwidth port information 78 representing the residual bandwidth of the respective ports in the respective physical storage apparatuses 3 in cases where there is no input/output of data to and from the target virtual logical volume VVOL.

The front-end port search unit 56 searches for front-end ports 24A, among the front-end ports 24A (FIG. 3) of the respective storage apparatuses 3, having a residual bandwidth which will enable such front-end ports 24A to become the change destination of the access path between the host computer 2 and the virtual storage apparatus VST based on the data offset information 77 and the corrected residual bandwidth port information 78, and generates the changeable front-end port information 79 as a list of such front-end ports 24A.

The back-end port pair search unit 57 searches for pairs of back-end ports 24B (these are hereinafter referred to as the "back-end port pairs"), among the back-end ports 24B (FIG. 3) of the respective storage apparatuses 3, to which is connected a path that may become the change destination of the path (access path) used for communicating with the other physical storage apparatuses 3 based on the port pair management table 74, the data offset information 77 and the corrected residual bandwidth port information 78, and generates the change-target back-end port pair information 81 as a list of such back-end port pairs.

The front-end port change control unit 58 controls the host computer 2 to change the connection destination of the access path that is used when the host computer 2 accesses the virtual logical volume VVOL to the front-end port 24A designated by the access path display unit 62 in the physical storage apparatus 3 designated by the access path display unit 62 based on the changeable front-end port information 79 described later, and consequently updates the path management table 70.

The back-end port change control unit 59 controls the respective physical storage apparatuses 3 to change the back-end port 24B that is used when the respective physical storage apparatuses 3 communicate with other physical storage apparatuses 3 to the back-end port 24B designated by the access path display unit 62 based on the change-target back-end port pair information 81 described later.

The access path diagnostic unit 60 is activated based on a request from the management client 5 according to operations performed by the system administrator, and diagnoses whether there is a problem with the access path from the target host computer (this is hereinafter referred to as the "target host computer") 2 to the target virtual logical volume (this is hereinafter referred to as the "target virtual logical volume") VVOL based on the virtual logical volume management table 71, the data offset threshold information 75 and the exclusion-target volume management table 76. The access path diagnostic unit 60 causes such diagnosis to be displayed as the access path diagnosis screen 90 or the detailed access path diagnosis screen 100 described later on the display device of the management client 5.

The access path search unit 61 is activated based on a request from the management client 5 according to operations performed by the system administrator, and identifies the path to become the change destination of the access path that is used when the target host computer 2 accesses the data stored in the target virtual logical volume VVOL according to the offset level of the data stored in the target virtual logical volume VVOL to the respective physical storage apparatuses 3, and notifies the identification result to the access path display unit 62.

The access path display unit 62 displays the path to become the change destination of the access path that is used when the target host computer 2 accesses the target virtual logical volume VVOL, which was identified by the access path search unit 61 based on the notification from the access path search unit 61, on the management client 5 as the access path changing screen 110 described later. Moreover, the access path display unit 62 changes the access path that is used when the target host computer 2 accesses the data stored in the target virtual logical volume VVOL to the path displayed on the access path changing screen 110 (that is, the path identified by the access path search unit 61) by controlling the front-end port change control unit 58 and the back-end port change control unit 59 according to the input operation performed by the system administrator by using the access path changing screen 110.

Meanwhile, the path management table 70 is a table that is used for managing all paths that can be used when the host computer 2 accesses the virtual logical volumes VVOL in the virtual storage apparatus VST, and is configured, as shown in FIG. 7, from a virtual logical volume ID column 70A, a host computer ID column 70B, a host computer port ID column 70C, a physical storage apparatus ID column 70D, a physical storage apparatus port ID column 70E, a LUN column 70F and an access path information column 70G.

The virtual logical volume ID column 70A stores the virtual logical volume ID that is assigned to each of the virtual logical volumes VVOL set in the virtual storage apparatus VST, and the host computer ID column 70B stores the identifier (host computer ID) of the host computer 2 using the corresponding virtual logical volume VVOL. Moreover, the host computer port ID column 70C stores the identifier (host computer port ID) of the port on the side of the host computer 2 to which the path corresponding to that entry (line) is connected.

In addition, the physical storage apparatus ID column 70D stores the identifier (physical storage apparatus ID) of the physical storage apparatus 3 to which the path corresponding to that entry is connected, and the physical storage apparatus port ID column 70E stores the port ID of the front-end port 24A (FIG. 3) in the physical storage apparatus 3 to which the foregoing path in the foregoing physical storage apparatus 3 is connected.

In addition, the LUN column 70F stores the identification number (LUN: Logical Unit Number) of the corresponding virtual logical volume VVOL that is recognized by the corresponding host computer 2, and the access path information column 70G stores information (this is hereinafter referred to as the "access path information") representing whether the path corresponding to that entry is the access path to be used when the corresponding host computer 2 accesses the corresponding virtual logical volume VVOL. Specifically, the access path information column 70G stores "true" when the corresponding path is the access path, and stores "false" when the corresponding path is not the access path.

The virtual logical volume management table 71 is a table that is used for managing the virtual logical volumes VVOL that are created in the virtual storage apparatus VST, and is configured, as shown in FIG. 8, from a virtual logical volume ID column 71A, a host computer ID column 71B, a traffic column 71C and a capacity column 71D.

The virtual logical volume ID column 71A stores the volume ID of all virtual logical volumes VVOL that are created in the virtual storage apparatus VST, and the host computer ID column 71B stores the host computer ID of the host computer 2 capable of using the corresponding virtual logical volume VVOL.

Moreover, the traffic column 71C stores the data volume (this is hereinafter referred to as the "traffic") per unit time (for instance, one second) of the data that is input/output to and from the corresponding virtual logical volume VVOL, and the capacity column 71D stores the capacity of the corresponding virtual logical volume VVOL.

The page management table 72 is a table that is used for managing from which physical storage apparatus 3 the physical page PP should be assigned to the respective logical pages LP (FIG. 5) of the virtual logical volumes VVOL created in the virtual storage apparatus VST, and is configured, as shown in FIG. 9, from a pool ID column 72A, a virtual logical volume ID column 72B, a logical page ID column 72C, a physical storage apparatus ID column 72D, a traffic column 72E, a capacity column 72F and a physical storage apparatus port ID column 72G.

The pool ID column 72A stores the identifier (pool ID) that is assigned to each of the apparatus transverse pools PL (FIG. 5) created in the virtual storage apparatus VST, and the virtual logical volume ID column 72B stores the virtual logical volume ID of the virtual logical volume VVOL created in that apparatus transverse pool PL.

Moreover, the page ID column 72C stores the identifier (logical page ID) that is assigned to each of the logical pages LP in the corresponding virtual logical volume VVOL, and the physical storage apparatus ID column 72D stores the identifier (physical storage apparatus ID) of the physical storage apparatus 3 that is assigning the physical PP to the corresponding logical page LP of the corresponding virtual logical volume VVOL.

Moreover, the traffic column 72E stores the traffic per unit time of the data that is input/output to and from the corresponding logical page LP of the corresponding virtual logical volume VVOL, and the capacity column 72F stores the capacity of the corresponding logical page LP. In addition, the physical storage apparatus port ID column 72G stores the port ID of the ports connected to the corresponding virtual logical volume VVOL among the ports (front-end ports 24A or back-end ports 24B) in the corresponding physical storage apparatus 3.

The port management table 73 is a table that is used for managing the respective ports (front-end ports 24A or back-end ports 24B) of the respective physical storage apparatuses 3 configuring the virtual storage apparatus VST, and is configured, as shown in FIG. 10, from a physical storage apparatus ID column 73A, a physical storage apparatus port ID column 73B, a port name column 73C, a residual bandwidth column 73D and a back-end port information column 73E.

The physical storage apparatus ID column 73A stores the physical storage apparatus ID of the respective physical storage apparatuses 3 configuring the virtual storage apparatus VST, and the physical storage apparatus port ID column 73B stores the port ID of the respective ports in the corresponding physical storage apparatus 3. Moreover, the port name column 73C stores the port name of the port that is displayed on the access path diagnosis screen 90 (FIG. 17) or the like described later, and the residual bandwidth column 73D stores the current residual bandwidth that is obtained by subtracting the bandwidth in use from the available bandwidth of the corresponding port.

In addition, the back-end port information column 73E stores information (this is hereinafter referred to as the "back-end port information") representing whether the corresponding port is the back-end port 24B. Specifically, the back-end port information column 73E stores "true" when the corresponding port is the back-end port 24B, and stores "false" when that port is not the back-end port 24B.

The port pair management table 74 is a table that is used for managing the back-end port pairs that are configured from a pair of the port of one physical storage apparatus 3 and the port of another physical storage apparatus 3 to which paths that connect the physical storage apparatuses 3 are respectively connected, or a pair of ports that are connected via a path in the physical storage apparatus 3, and is configured, as shown in FIG. 11, from a physical storage apparatus ID-A column 74A, a physical storage apparatus port ID-A column 74B, a physical storage apparatus ID-B column 74C, a physical storage apparatus port ID-B column 74D, an inter-physical storage apparatus port pair information column 74E, an access path information column 74F, a virtual logical volume ID column 74G and a host computer ID column 74H.

The physical storage apparatus ID-A column 74A and the physical storage apparatus port ID-A column 74B respectively store the physical storage apparatus ID of one physical storage apparatus 3 to which the path corresponding to that entry (line) is connected, and the port ID of the port to which that path in that physical storage apparatus 3 is connected, and the physical storage apparatus ID-B column 74C and the physical storage apparatus port ID-B column 74D respectively store the physical storage apparatus ID of the other physical storage apparatus 3 to which the foregoing path is connected, and the port ID of the port to which that path in that physical storage apparatus 3 is connected.

Moreover, the inter-physical storage apparatus port pair information column 74E stores information representing whether the corresponding path is the path that is connecting the physical storage apparatuses 3. Specifically, the inter-physical storage apparatus port pair information column 74E stores "true" when the foregoing path is the path that is connecting the physical storage apparatuses 3, and stores "false" when the foregoing path is not the path that is connecting the physical storage apparatuses 3 (that is, when that path is a path that is connecting one port and another port in the same physical storage apparatus 3).

In addition, the virtual logical volume ID column 74G stores the volume ID of the virtual logical volume VVOL to which the corresponding path is connected, and the host computer ID column 74H stores the host computer ID of the host computer 2 capable of accessing that virtual logical volume VVOL.

In addition, the access path information column 74F stores information representing whether the corresponding path is the access path. Specifically, the access path information column 74F stores "true" when the corresponding path is the access path, and stores "false" when that path is not the access path. Note that the term "access path" as used herein refers to the path that is used when the host computer 2 accesses the data stored in the corresponding virtual logical volume VVOL.

The data offset threshold management table 75 is a table that is used for managing the foregoing data offset threshold and unused port bandwidth threshold that were set by the system administrator, and is configured from a data offset threshold column and an unused port bandwidth threshold column. The data offset threshold column stores the data offset threshold, and the unused port bandwidth threshold column stores the unused port bandwidth threshold.

The exclusion-target volume management table 76 is a table that is used for managing the virtual logical volumes VVOL that are to be excluded from the access path diagnosis processing (FIG. 20) and the access path automatic change processing (FIG. 27) by the system administrator, and stores the virtual logical volume ID of the virtual logical volumes VVOL to be excluded from the access path diagnosis processing and the access path automatic change processing that were set by the system administrator in advance.

The data offset information 77 is information that is used for managing the offset status of the distribution of data to the respective physical storage apparatuses 3 configuring the virtual logical volume VVOL, and is created in the access path diagnosis processing (FIG. 20A, FIG. 20B) and the access path search processing (FIG. 22) described later with regard to the target virtual logical volume VVOL. The data offset information 77 is configured, as shown in FIG. 12, from a physical storage apparatus ID column 77A, a total traffic column 77B, a traffic ratio column 77C and an access path information column 77D.

The physical storage apparatus ID column 77A stores the physical storage apparatus ID of all physical storage apparatuses 3 that configure the target virtual logical volume VVOL, and the total traffic column 77B stores the total volume (this is hereinafter referred to as the "total traffic") of data that is transferred to the corresponding physical storage apparatus 3 among all data that are transferred to that virtual logical volume VVOL.

Moreover, the traffic ratio column 77C stores the ratio of the data volume that was transferred by the corresponding physical storage apparatus 3 to another physical storage apparatus 3 via the inter-apparatus communication network 7 relative to all data that were transferred to the target virtual logical volume VVOL (corresponds to the total value of the total traffic of the respective entries of the data offset information 77).

In addition, the access path information column 77D stores information (access path information) representing whether the path from the host computer 2 to the corresponding physical storage apparatus 3 is the access path. Specifically, the access path information column 77D stores "true" when the path from the host computer 2 to the corresponding physical storage apparatus 3 is the access path, and stores "false" when that path is not the access path.

The corrected residual bandwidth port information 78 is information that is used for managing the residual bandwidth of the respective ports in the respective physical storage apparatuses 3 when there is no data transfer to and from the corresponding virtual logical volume VVOL, and is created in the access path search processing (FIG. 22) described later. The corrected residual bandwidth port information 78 is configured, as shown in FIG. 13, from a physical storage apparatus ID column 78A, a physical storage apparatus port ID column 78B, a port name column 78C, a residual bandwidth column 78D and a back-end port information column 78E.

The physical storage apparatus ID column 78A stores the physical storage apparatus ID of the respective physical storage apparatuses 3 configuring the respective virtual logical volumes VVOL. Moreover, the physical storage apparatus port ID column 78B stores the port ID of the port (front-end port 24A or back-end port 24B) in that physical storage apparatus 3 connected to that virtual logical volume VVOL, and the port name column 78C stores the port name of the port that is displayed on the access path diagnosis screen 90 (FIG. 17) or the like described later.

In addition, the residual bandwidth column 78D stores the residual bandwidth of the corresponding port in the case of assuming that there is no data transfer to the corresponding virtual logical volume VVOL, and the back-end port information column 78E stores information (back-end port information) representing whether that port is the back-end port. Specifically, the back-end port information column 78E stores "true" when the corresponding port is the back-end port, and stores "false" when that port is not the back-end port.

The changeable front-end port information 79 is a list of the front-end ports 24A (FIG. 3) having a residual bandwidth which enables such front-end ports 24A to become a new access path to and from the host computer 2, and is created in the front-end port search processing described later with reference to FIG. 24. The changeable front-end port information 79 is configured, as shown in FIG. 14, a physical storage apparatus ID column 79A, a physical storage apparatus port ID column 79B, a port name column 79C and a residual bandwidth column 79D.

The physical storage apparatus port ID column 79B stores the port ID of the front-end port 24A having a residual bandwidth which enables such front-end port 24A to become the change destination of the access path to and from the host computer among the front-end ports 24A (FIG. 3) in the physical storage apparatuses 3 configuring the corresponding virtual logical volume VVOL, and the physical storage apparatus ID column 79A stores the physical storage apparatus ID of the physical storage apparatus 3 comprising that front-end port 24A.

Moreover, the port name column 79C stores the port name of the front-end port 24A that is displayed on the access path diagnosis screen 90 or the like described later with reference to FIG. 17, and the residual bandwidth column 79D stores the residual bandwidth of the corresponding front-end port 24A in the case of assuming that there is no input/output of data to and from the corresponding virtual logical volume VVOL.

The change-target front-end port information 80 is a list of the front-end ports 24A, among the front-end ports 24A registered in the changeable front-end port information 79, to which is connected a path capable of becoming the change destination of the access path to connect the host computer 2 and the virtual storage apparatus VST even when consideration is given to the residual bandwidth of the back-end port 24B. In the change-target front-end port information 80, one front-end port 24A is registered for one virtual logical volume VVOL. The change-target front-end port information 80 is created in the access path search processing described later with reference to FIG. 22.

The change-target front-end port information 80 is configured, as shown in FIG. 15, from a physical storage apparatus ID column 80A, a physical storage apparatus port ID column 80B, a port name column 80C, a residual bandwidth column 80D, a host computer ID column 80E and a virtual logical volume ID column 80F.

The physical storage apparatus port ID column 80B stores the port ID of the front-end port 24A to which is connected a path capable of becoming the foregoing change destination, and the physical storage apparatus ID column 80A stores the physical storage apparatus ID of the physical storage apparatus 3 comprising the corresponding front-end port 24A.

Moreover, the port name column 80C stores the port name of the front-end port 24A that is displayed on the access path diagnosis screen 90 or the like described later with reference to FIG. 17, and the residual bandwidth column 80D stores the residual bandwidth of the corresponding front-end port 24A.

In addition, the host computer ID column 80E stores the host computer ID of the host computer 2 that is connected to the corresponding front-end port 24A, and the virtual logical volume ID column 80F stores the volume ID of the virtual logical volume VVOL that is accessible via that front-end port 24A.

The change-target back-end port pair information 81 is a list of pairs (these are hereinafter referred to as the "back-end port pairs"), among the paths connecting the physical storage apparatuses 3 (these are hereinafter referred to as the "back-end paths"), of the back-end port 24B of one physical storage apparatus 3 to which is connected the back-end path capable of becoming the change destination of the access path and the back-end port 24B of the other physical storage apparatus 3. In the change-target back-end port pair information 81, one back-end port pair is registered between the respective physical storage apparatuses 3. The change-target back-end port pair information 81 is created in the back-end port pair search processing described later with reference to FIG. 25.

The change-target back-end port pair information 81 is configured, as shown in FIG. 16, from a physical storage apparatus ID-A column 81A, a physical storage apparatus port ID-A column 81B, a physical storage apparatus ID-B column 81C, a physical storage apparatus port ID-B column 81D, a host computer ID column 81E and a virtual logical volume ID column 81F.

The physical storage apparatus ID-A column 81A and the physical storage apparatus port ID-A column 81B respectively store the physical storage apparatus ID of one physical storage apparatus 3 that is connected to the back-end path corresponding to that entry (line), and the port ID of the port to which that back-end path in that physical storage apparatus 3 is connected, and the physical storage apparatus ID-B column 81C and the physical storage apparatus port ID-B column 81D respectively store the physical storage apparatus ID of the other physical storage apparatus 3 to which the foregoing back-end path is connected, and the port ID of the port to which that back-end path in that physical storage apparatus 3 is connected.

Moreover, the host computer ID column 81E stores the host computer ID of the host computer 2 that uses the corresponding back-end path as the access path, and the virtual logical volume ID column 81F stores the volume ID of the virtual logical volume VVOL that is accessible by that host computer 2 via that back-end path.

(3) Configuration of Various Screens

The configuration of various GUI (Graphical User Interface) screens to be displayed on the management client is now explained above with reference to FIG. 17 to FIG. 19.

Figure 17:
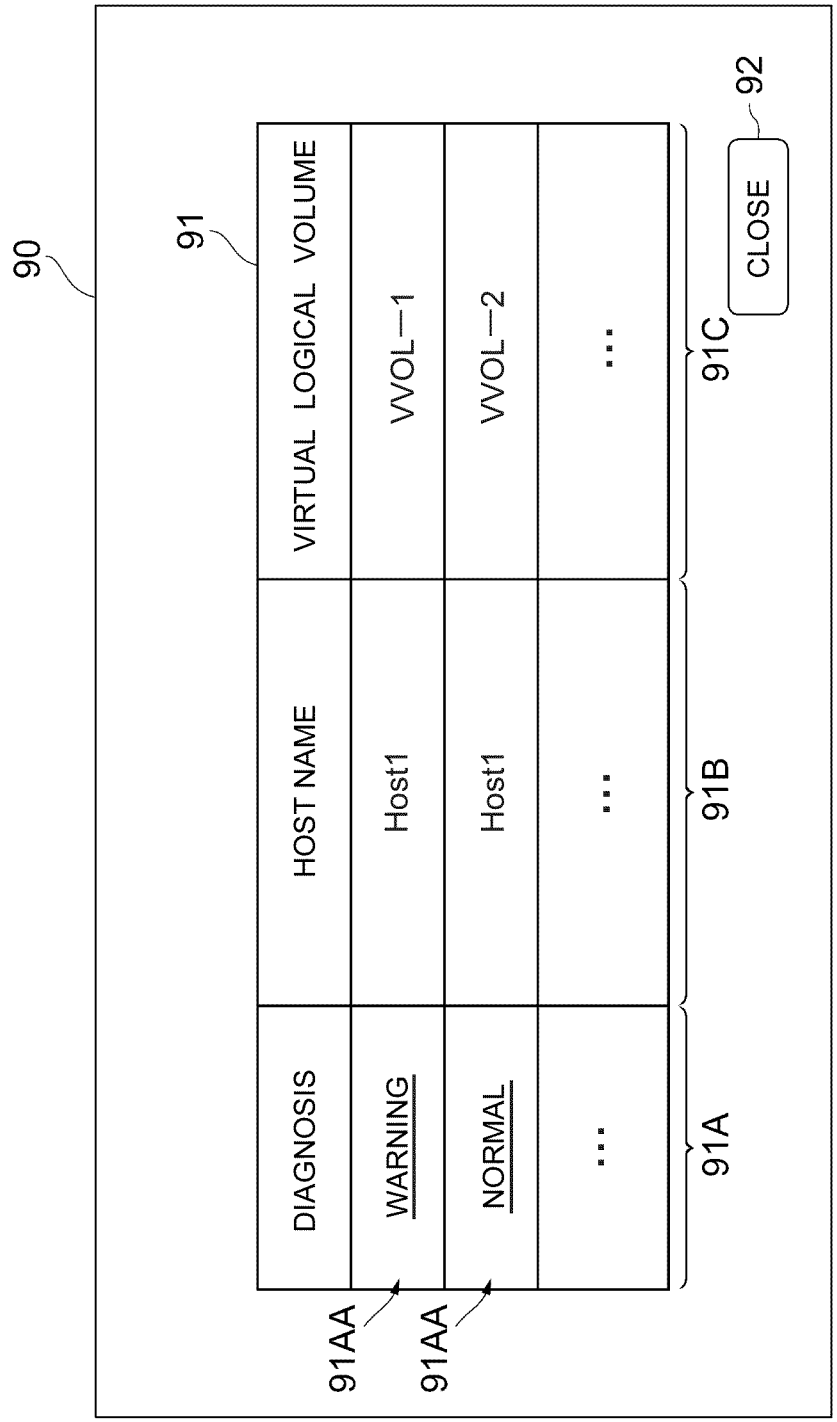
FIG. 17 is a schematic diagram schematically showing the configuration of the access path diagnosis screen.

FIG. 17 shows the configuration example of the access path diagnosis screen 90 that can be displayed on the management client 5 based on predetermined operations. The access path diagnosis screen 90 is a GUI screen for displaying the operating status of the access path that is used when the host computer 2 accesses the virtual logical volume VVOL, which is detected in the access path diagnosis processing described later with reference to FIG. 20A and FIG. 20B.

The access path diagnosis screen 90 is configured from an access path operating status list 91, and a close button 92. The access path operating status list 91 is a list of the diagnostic results regarding the operating status of the respective paths from the host computer 2 to the respective virtual logical volumes VVOL, and is configured from a diagnostic result column 91A, a host name column 91B and a virtual logical volume column 91C.

The host name column 91B displays the name (host name) of the host computer 2 to which the corresponding access path is connected, and the virtual logical volume column 91C displays the virtual logical volume ID of the virtual logical volume VVOL that is accessible by the host computer 2 via that access path.

Moreover, the diagnostic result column 91A displays the diagnostic result regarding the corresponding access path. In the foregoing case, "warning", "normal" or the like may be displayed as the diagnostic result.

Here, "warning" represents that, as a result of diagnosing the corresponding access path, it was determined that there is a problem with that access path. In this embodiment, "a problem with the access path" refers to a case where the residual bandwidth of the front-end port 24A (FIG. 3) to which the access path is connected in the physical storage apparatus 3 that is directly connected to the host computer 2 via that access path or the residual bandwidth of one of the back-end ports 24B in the physical storage apparatuses 3 to which is connected the back-end path that is being used as the access path from that physical storage apparatus 3 to the other physical storage apparatuses 3 is less than the foregoing unused port bandwidth threshold, or a status where data of a data volume that is less than the foregoing data offset threshold, among the data stored in the corresponding virtual logical volume VVOL, is stored in the physical storage apparatus 3 that is directly connected to the host computer 2 via the access path.

Moreover, "normal" represents that, as a result of diagnosing the corresponding access path, it was determined that there is no problem with that access path. In this embodiment, "no problem with the access path" refers to a case where the residual bandwidth of the front-end port 24A (FIG. 3) to which the access path is connected in the physical storage apparatus 3 that is directly connected to the host computer 2 via that access path is greater than the unused port bandwidth threshold and the residual bandwidth of one of the back-end ports 24B in the physical storage apparatuses 3 to which is connected the back-end path that is being used as the access path from that physical storage apparatus 3 to the other physical storage apparatuses 3 is also greater than the unused port bandwidth threshold, and a status where data of a data volume that is greater than the foregoing data offset threshold, among the data stored in the corresponding virtual logical volume VVOL, is stored in the physical storage apparatus 3 that is directly connected to the host computer 2 via the access path.

Figure 18:
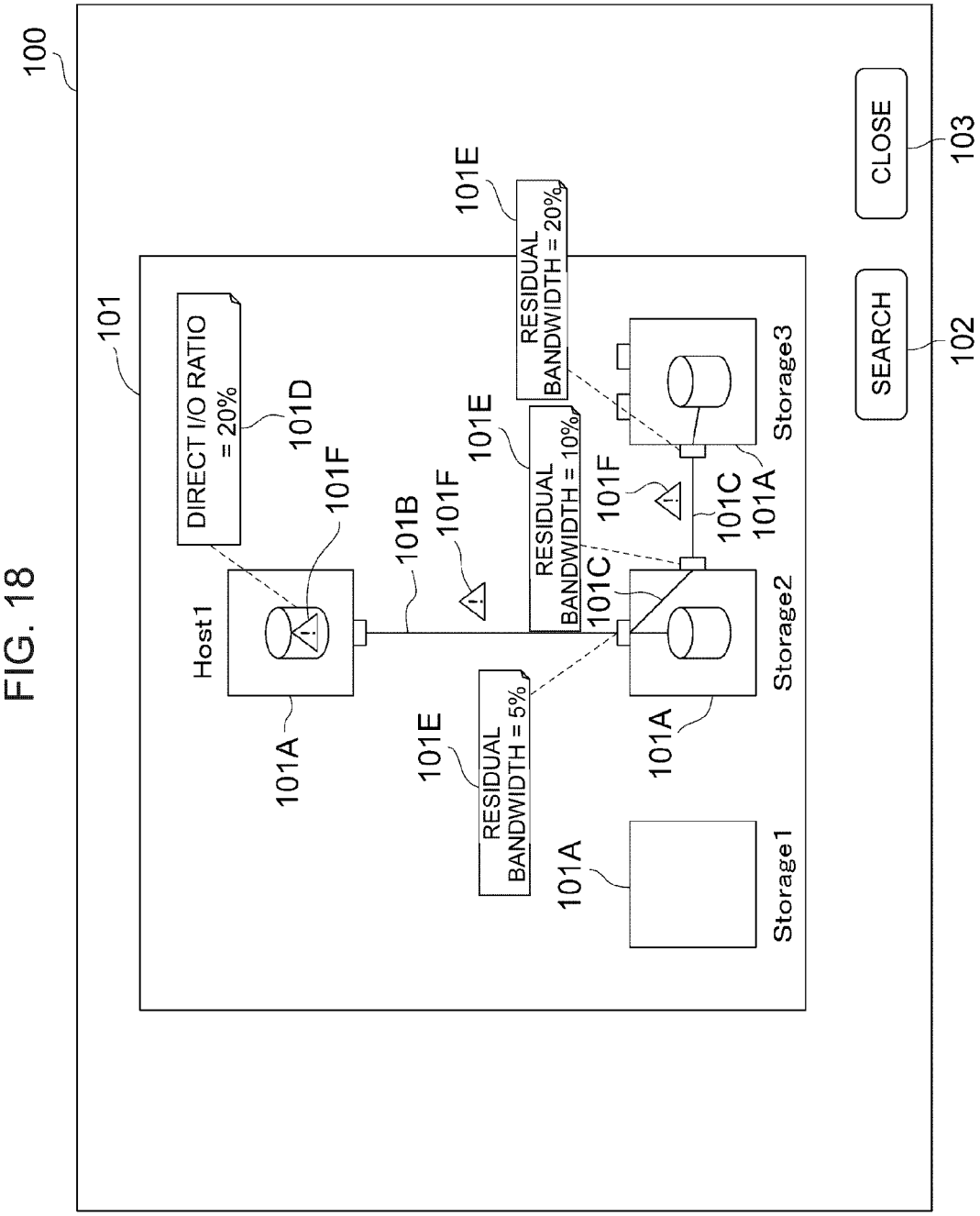
FIG. 18 is a schematic diagram schematically showing the configuration of the detailed access path diagnosis screen.

In addition, the system administrator can display the detailed access path diagnosis screen 100 shown in FIG. 18 in substitute for the access path diagnosis screen 90 by clicking the character string 91AA representing the diagnostic result ("warning" or "normal") displayed on the intended diagnostic result column 91A of the access path operating status list 91, or close the access path diagnosis screen 90 by clicking the close button 92.

The detailed access path diagnosis screen 100 is a GUI screen for displaying the details of the diagnostic result of the access path that was designated on the access path diagnosis screen 90 (for which the character string 91AA representing the diagnostic result was clicked). The detailed access path diagnosis screen 100 is configured, as shown in FIG. 18, from a detailed diagnostic result display field 101, a search button 102 and a close button 103.

The detailed diagnostic result display field 101 displays, for instance, icons 101A that schematically represent the host computer 2 and the respective physical storage apparatuses 3 configuring the corresponding virtual logical volume VVOL in the virtual storage apparatus VST, a line 101B representing the access path from the host computer 2 to the virtual storage apparatus VST, and lines 101C representing the corresponding access paths existing in the virtual storage apparatus VST (corresponding access path between the physical storage apparatuses 3, corresponding access path in the physical storage apparatus 3).

Moreover, the detailed diagnostic result display field 101 displays information ("direct I/O ratio") 101D representing the ratio of I/O to the physical storage apparatus 3 to which access path from the host computer 2 is directly connected among the I/Os that are issued from the host computer 2 to the corresponding virtual logical volume VVOL, and information ("residual bandwidth") 101E representing the residual bandwidth of the front-end port 24A (FIG. 3) or the back-end port 24B to which the corresponding access path is connected.

In addition, the detailed diagnostic result display field 101 displays a warning mark 101F representing a problematic portion. For example, when data of a data volume that is less than the foregoing data offset threshold, among the data stored in the corresponding virtual logical volume VVOL, is stored in the physical storage apparatus 3 that is directly connected to the host computer 2 via the access path, the warning mark 101F is displayed in the host computer 2. Moreover, when the residual bandwidth of the front-end port 24A (FIG. 3) to which the access path is connected in the physical storage apparatus 3 that is directly connected to the host computer 2 via that access path is less than the foregoing unused port bandwidth threshold, the warning mark 101F is displayed near the line 101B representing the access path connecting the host computer 2 and that physical storage apparatus 3. In addition, when the residual bandwidth of one of the back-end ports 24B in the physical storage apparatuses 3 to which is connected the back-end path that is being used as the access path from that physical storage apparatus 3 to the other physical storage apparatuses 3 is less than the foregoing unused port bandwidth threshold, the warning mark 101F is displayed near the line 101C representing the access path connecting these physical storage apparatuses 3.

In addition, the system administrator can close the detailed access path diagnosis screen 100 by clicking the close button 103, and cause the management computer 4 to execute the access path search processing (FIG. 22) of searching for the optimal access path as the switching destination of the foregoing access path by clicking the search button 102.

Figure 19:
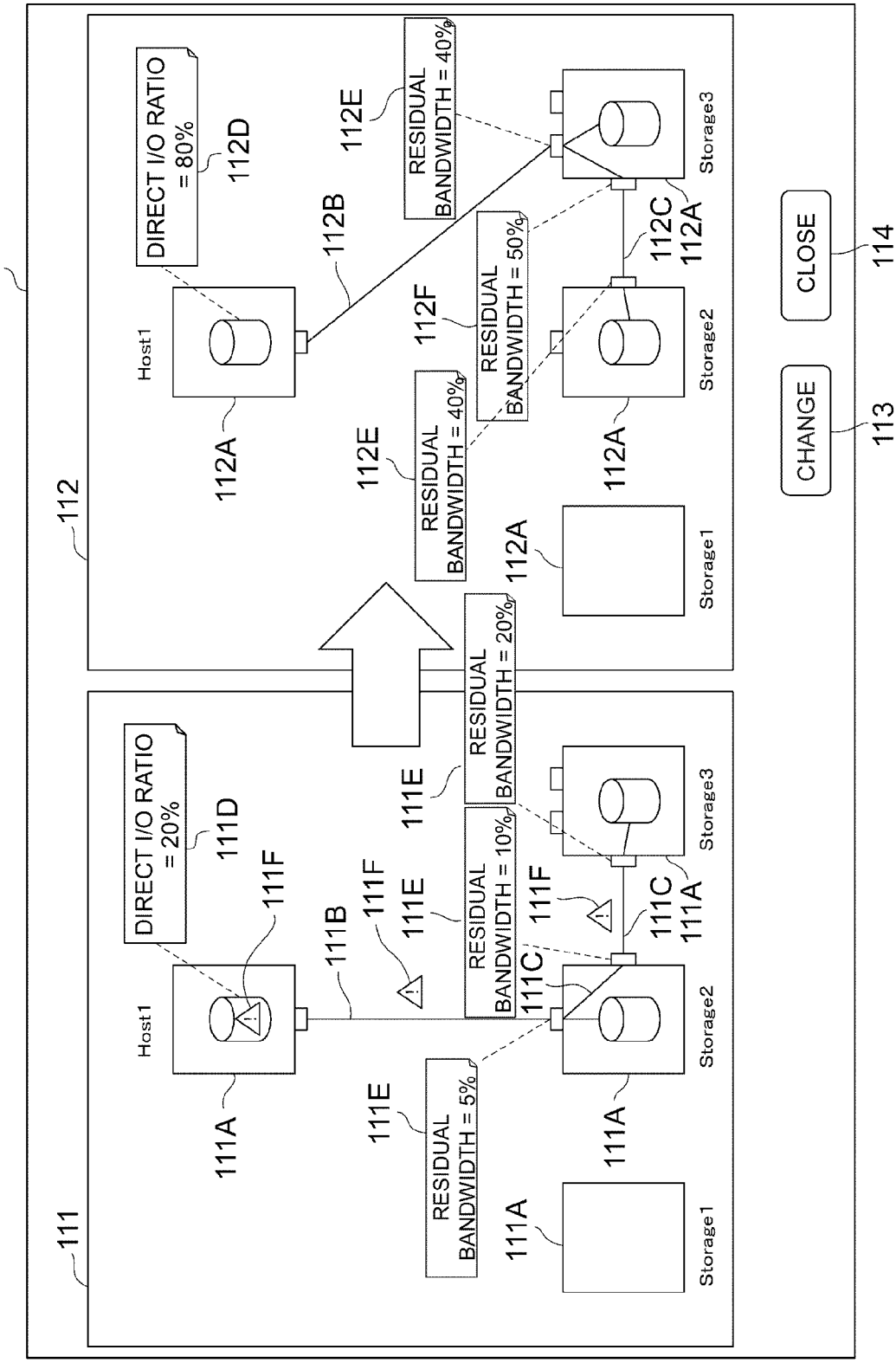
FIG. 19 is a schematic diagram schematically showing the configuration of the access path changing screen.

FIG. 19 shows the configuration example of the access path changing screen 110 that is displayed on the management client 5 as a result of the foregoing access path search processing in substitute for the detailed access path diagnosis screen 100 after the management computer 4 executes the foregoing access path search processing. As evident from FIG. 19, the access path changing screen 110 is configured from a before-update status display field 111, an after-update status display field 112, a change button 113 and a close button 114.

The before-update status display field 111 displays, as is, the contents that were displayed on the detailed diagnostic result display field 101 of the previous detailed access path diagnosis screen 100. Moreover, the after-update status display field 112 displays, according to the same display mode as the before-update status display field 111, the optimal access path between the host computer 2 and the physical storage apparatus 3, the optimal access path in the physical storage apparatus 3, and the optimal access path between the physical storage apparatuses 3 that were detected in the foregoing access path search processing.

In effect, the before-update status display field 111 and the after-update status display field 112 display icons 111A, 112A schematically representing the host computer 2 and the respective physical storage apparatuses 3 configuring the corresponding virtual logical volume VVOL in the virtual storage apparatus VST, lines 111B, 112B representing the access paths from the host computer 2 to the virtual storage apparatus VST, and lines 111C, 112C representing the corresponding access paths existing in the virtual storage apparatus VST (corresponding access path between the physical storage apparatuses 3, corresponding access path in the physical storage apparatus 3).

Moreover, the before-update status display field 111 and the after-update status display field 112 additionally display information ("direct I/O ratio") 111D, 112D representing the ratio of I/O to the physical storage apparatus 3 to which access path from the host computer 2 is directly connected among the I/Os that are issued from the host computer 2 to the corresponding virtual logical volume VVOL, and information ("residual bandwidth") 111E, 112E representing the residual bandwidth of the front-end port 24A (FIG. 3) or the back-end port 24B to which the corresponding access path is connected. In addition, the detailed diagnostic result display field displays the foregoing warning mark 111F at the problematic location.

Consequently, the system administrator clicks the change button 113 when he/she wishes to change the access path from the host computer 2 to the virtual logical volume VVOL to the state displayed in the after-update status display field 112. As a result, based on the control of the management computer 4, the access path from the host computer 2 to the virtual logical volume VVOL is changed to the access path that is displayed in the after-update status display field 112. Moreover, the system administrator can close the access path changing screen 110 by clicking the close button 114 without changing the access path from the host computer 2 to the virtual logical volume VVOL.

(4) Various Types of Processing

The specific processing contents of the various types of processing that are executed in relation to the foregoing diagnosis of the access path, search for the optimal access path, and change of the access path based on the search result are now explained. Note that, in the ensuing explanation, while the processing entry of the various types of processing is explained as the program module of the control program 40 (FIG. 4) of the management computer 4 (FIG. 4), in effect, it goes without saying that the CPU 30 (FIG. 4) of the management computer 4 executes the processing based on the program module.

(4-1) Access Path Diagnosis Processing

Figure 20A:
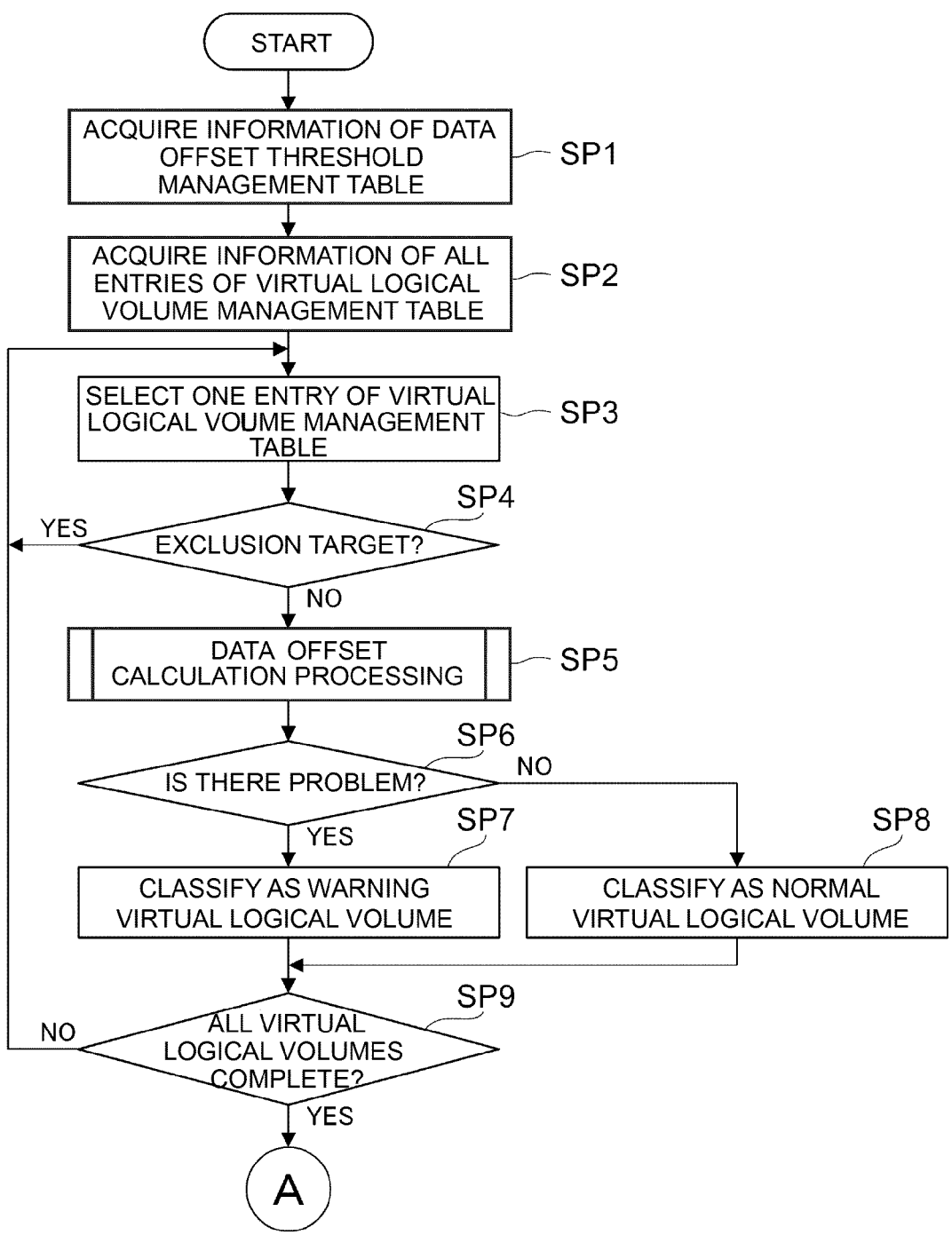
FIG. 20A is a flowchart showing the processing routine of the access path diagnosis processing.
Figure 20B:
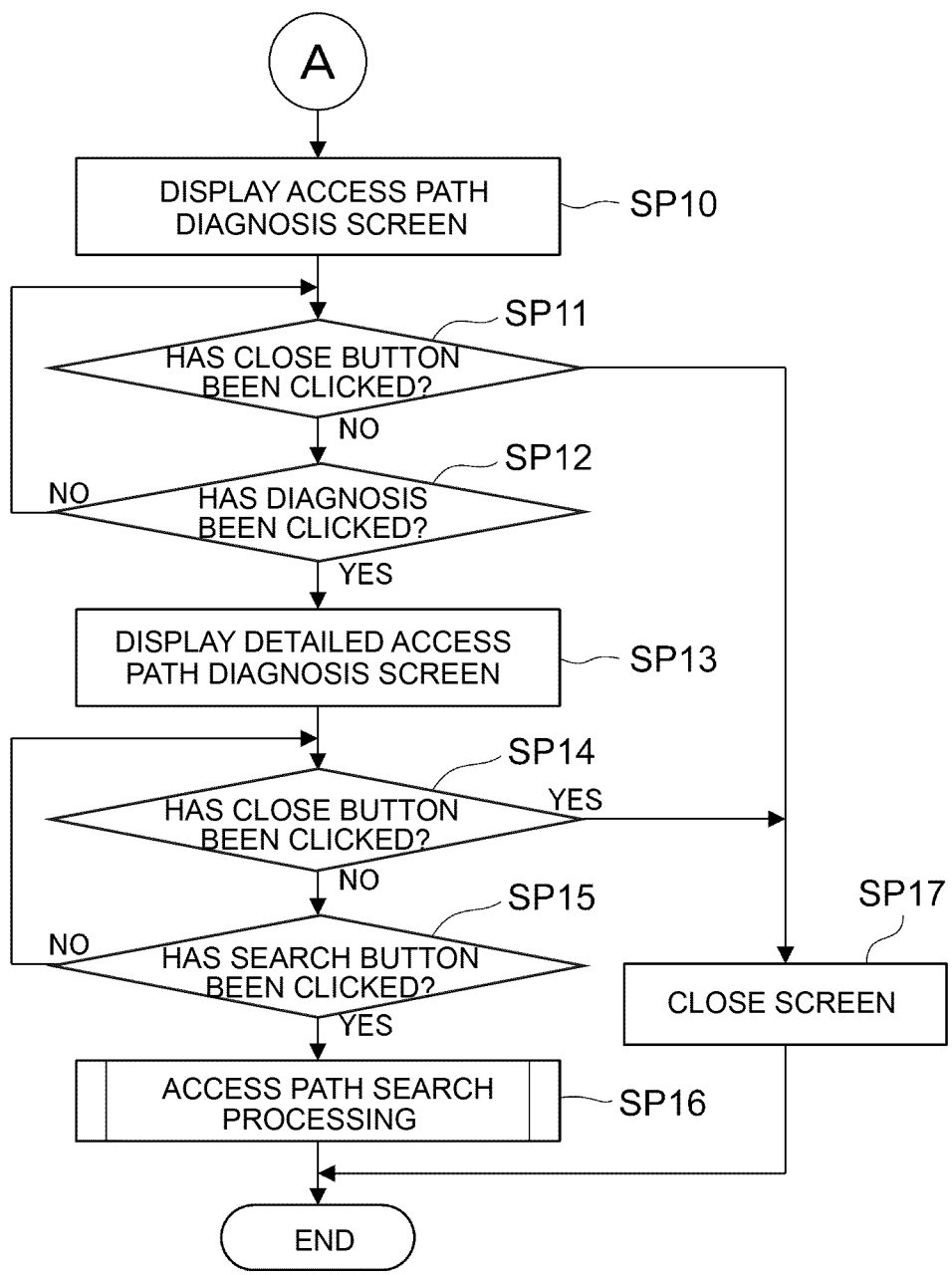
FIG. 20B is a flowchart showing the processing routine of the access path diagnosis processing.

When the management client 5 is operated and a command for executing the diagnosis of the access path is input, the management client 5 sends an access path diagnosis request to the management computer 4. FIG. 20A and FIG. 20B show the processing contents of the access path diagnosis processing to be executed by the access path diagnostic unit 60 (FIG. 6) when the access path diagnosis request is sent to the management computer 4.

When the access path diagnostic unit 60 receives the access path diagnosis request from the management client 5, the access path diagnostic unit 60 starts the access path diagnosis processing shown in FIG. 20A and FIG. 20B. The access path diagnostic unit 60 foremost acquires the data offset threshold and the unused port bandwidth threshold from the data offset threshold management table 75 (SP1), and thereafter acquires information of all entries of the virtual logical volume management table 71 (FIG. 8) (SP2).

Subsequently, the access path diagnostic unit 60 selects one unprocessed entry that has not yet been subject to the processing of step SP3 to step SP9 among the entries for which information was acquired in step SP2 (SP3), and determines whether the virtual logical volume VVOL corresponding to that entry is a virtual logical volume VVOL to be excluded from the access path diagnosis processing (SP4). Specifically, the access path diagnostic unit 60 determines, in step SP4, whether the virtual logical volume ID stored in the virtual logical volume ID column 71A (FIG. 8) of the entry selected in step SP3 is registered in the exclusion-target volume management table 76.

When the access path diagnostic unit 60 obtains a positive result in step SP4, the access path diagnostic unit 60 returns to step SP3, and thereafter repeats the loop of step SP3-step SP4-step SP3 until a positive result is obtained in step SP4.

Meanwhile, when the access path diagnostic unit 60 obtains a negative result in step SP4, the access path diagnostic unit 60 calls the data offset calculation unit 54 (FIG. 6), and sends to the data offset calculation unit 54, as an argument, the virtual logical volume ID stored in the virtual logical volume ID column 71A of the entry of the virtual logical volume management table 71 selected in step SP3 and the host computer ID stored in the host computer ID column 71B (SP5). Consequently, the data offset calculation processing (FIG. 21) described later is executed by the data offset calculation unit 54, and the data offset information 77 (FIG. 12) regarding the virtual logical volume VVOL corresponding to the entry selected in step SP3 is created.

Subsequently, the access path diagnostic unit 60 determines whether there is a problem with the access path from the host computer 2 to the target virtual logical volume VVOL based on the data offset information 77 created by the data offset calculation unit 54 in step SP5 and the data offset threshold and the unused port bandwidth threshold acquired in step SP1 (SP6). The foregoing determination is made . . . based on whether the ratio of the currently used bandwidth (access volume) relative to the maximum bandwidth of the path that is being used for the data transfer between the physical storage apparatuses 3 among the paths connecting the physical storage apparatus 3 that is directly connected to the host computer 2 via the access path, and another physical storage apparatus 3, is . . . .

Specifically, the access path diagnostic unit 60 determines whether the target virtual logical volume VVOL satisfies at least one of the following conditions of (A) to (C).

(A) The traffic ratio stored in the traffic ratio column 77C (FIG. 12) of the entry in which "true" is stored in the access path information column 77D (FIG. 12) (that is, entry corresponding to the physical storage apparatus 3 that is directly connected to the host computer 2 via the access path) among the entries of the data offset information 77 created in step SP5 is smaller than the data offset threshold acquired in step SP1.

(B) The ratio of the residual bandwidth of the front-end port 24A relative to the maximum bandwidth (this is hereinafter referred to as the "maximum bandwidth") that can be used by that front-end port 24A to which the access path to and from the host computer is connected among the front-end ports 24A (FIG. 3) in the physical storage apparatus corresponding to the entry in which "true" is stored in the access path information column 77D (that is, the physical storage apparatus 3 that is directly connected to the host computer 2 via the access path) among the entries of the data offset information 77 is smaller than the unused port bandwidth threshold acquired in step SP1.

(C) The ratio of the residual bandwidth of the back-end port 24B relative to the maximum bandwidth of one of the back-end ports 24B (FIG. 3) to which the access path to and from another physical storage apparatus 3 is connected is smaller than the unused port bandwidth threshold acquired in step SP1 in all physical storage apparatuses 3.

Note that the condition of (A) described above is a condition for detecting the offset of the input/output of data to and from the physical storage apparatuses 3 other than the physical storage apparatus 3 that is directly connected to the host computer 2 via the access path.

When the access path diagnostic unit 60 obtains a positive result in the determination of step SP6 (when at least one condition among the three conditions described above is satisfied), the access path diagnostic unit 60 classifies the target virtual logical volume VVOL as a warning virtual logical volume representing a virtual logical volume VVOL which has a problem with the access path (SP7).

Meanwhile, when the access path diagnostic unit 60 obtains a negative result in the determination of step SP6 (when none of the three conditions described above is satisfied), the access path diagnostic unit 60 classifies the target virtual logical volume VVOL as a normal virtual logical volume representing a virtual logical volume VVOL which has no problem with the access path (SP8).

Subsequently, the access path diagnostic unit 60 determines whether the processing of step SP4 to step SP8 has been executed for all entries of the virtual logical volume management table 71 (SP9). When the access path diagnostic unit 60 obtains a negative result in this determination, the access path diagnostic unit 60 returns to step SP3, and thereafter repeats the processing of step SP3 to step SP9 until a positive result is obtained in step SP9.

When the access path diagnostic unit 60 eventually obtains a positive result in step SP9 as a result of classifying all virtual logical volumes VVOL registered in the virtual logical volume management table 71 as either a warning virtual logical volume or a normal virtual logical volume, the access path diagnostic unit 60 sends to the management client 5 as the access path diagnostic result information, together with the display command for displaying the access path diagnosis screen 90 (FIG. 17), the virtual logical volume ID of all virtual logical volumes VVOL registered in the virtual logical volume management table 71, the host name, and the attribute information representing whether the virtual logical volume is a warning virtual logical volume or a normal virtual logical volume (SP10).

Consequently, the management client 5 that received the foregoing display command and access path diagnostic result information displays the access path diagnosis screen 90 explained above with reference to FIG. 17 based on the access path diagnostic result information. Here, the management client 5 displays a character string 91AA (FIG. 17) of "warning" as information representing that there is a problem with the access path in the diagnostic result column 91A (FIG. 17) of the corresponding entry in the diagnostic result list 91 (FIG. 17) of the access path diagnosis screen 90 with regard to the warning virtual logical volume, and displays a character string 91AA of "normal" as information representing that there is no problem with the access path in the diagnostic result column 91A of the corresponding entry with regard to the normal virtual logical volume.

The access path diagnostic unit 60 thereafter waits for the close button 92 of the access path diagnosis screen 90 to be clicked, or the character string 91AA of either "warning" or "normal" stored in the diagnostic result column 91A of the diagnostic result list 91 to be clicked (SP11, SP12).

The access path diagnostic unit 60 commands the management client 5 to close the access path diagnosis screen 90 when the close button 92 is clicked (SP17), and thereafter ends this access path diagnosis processing.

Meanwhile, when the character string 91AA of either "warning" or "normal" stored in the diagnostic result column 91A of the diagnostic result list 91 is clicked, the access path diagnostic unit 60 sends, to the management client 5, a display command for displaying the detailed access path diagnosis screen 100 explained above with reference to FIG. 18, and the various types of information that are required for displaying the detailed access path diagnosis screen 100 (SP13). The detailed access path diagnosis screen 100 is thereby displayed by the management client 5.

The access path diagnostic unit 60 thereafter waits for the close button 103 or the search button 102 of the detailed access path diagnosis screen 100 to be clicked (SP14, SP15). The access path diagnostic unit 60 commands the management client 5 to close the detailed access path diagnosis screen 100 when the close button 103 is clicked (SP17), and thereafter ends this access path diagnosis processing.

Meanwhile, the access path diagnostic unit 60 calls the access path search unit 61 (FIG. 6) when the search button 102 is clicked, and, after sending the virtual logical volume ID of the target virtual logical volume VVOL and the host computer ID of the host computer 2, and an execution command for executing the access path search processing (SP16) to the access path search unit 61, ends this access path diagnosis processing.

(4-2) Data Offset Calculation Processing

Figure 21:
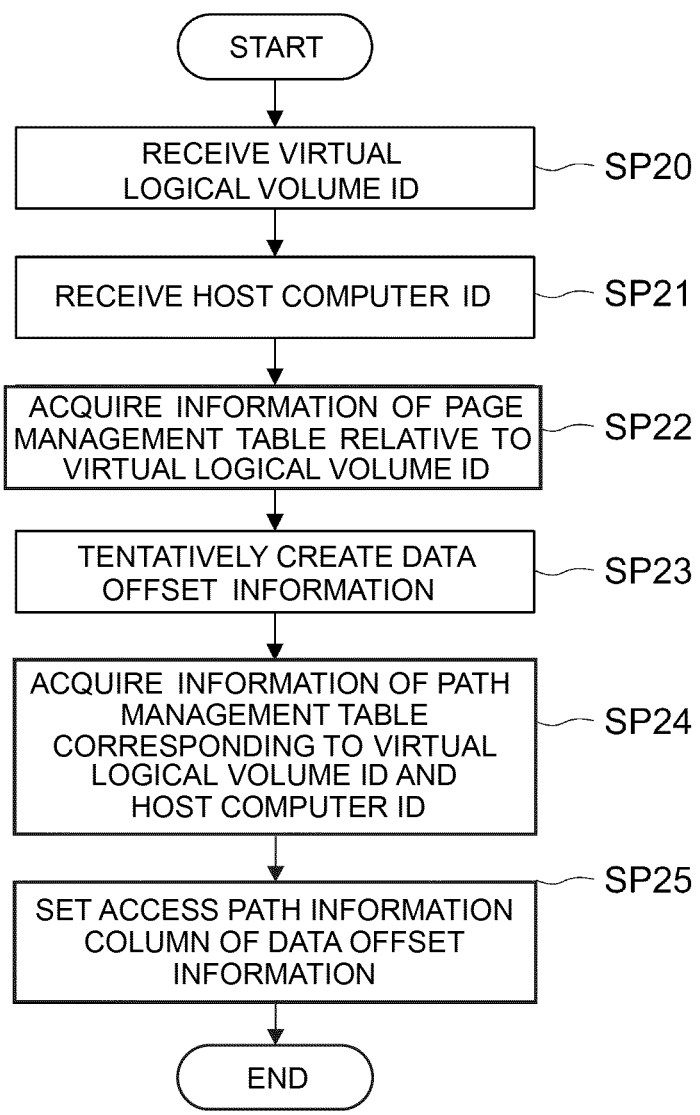
FIG. 21 is a flowchart showing the processing routine of the data offset calculation processing.

FIG. 21 shows the processing routine of the data offset calculation processing to be executed by the data offset calculation unit 54 (FIG. 6) that was called by the access path diagnostic unit 60 in step SP5 of the foregoing access path diagnosis processing (FIG. 20A and FIG. 20B).

When the data offset calculation unit 54 receives an execution command for executing the access path search processing from the access path diagnostic unit 60, the data offset calculation unit 54 starts the data offset calculation processing shown in FIG. 21, and foremost sequentially receives the virtual logical volume ID of the target virtual logical volume VVOL and the host computer ID of the host computer 2 that are sent from the call source (the access path diagnostic unit 60 in this example) (SP20, SP21).

Subsequently, the data offset calculation unit 54 acquires information of all entries, among the entries of the page management table 72 (FIG. 9), in which the virtual logical volume ID that is the same as the virtual logical volume ID of the target virtual logical volume VVOL received in step SP20 is stored in the virtual logical volume ID column 72B (FIG. 9) (SP22).

Subsequently, the data offset calculation unit 54 tentatively creates the data offset information 77 (FIG. 6) by executing (A) to (C) below based on the information acquired in step SP22 (SP23).

(A) Total the traffics that are each stored in the traffic column 72E of the respective entries, among the respective entries for which information was acquired in step SP22, in which the physical storage apparatus ID stored in the physical storage apparatus ID column 72D is the same. This add processing is performed to all types of physical storage apparatus IDs stored in the physical storage apparatus ID column 72D. It is thereby possible to calculate the total value (total traffic) of data traffic per unit time that arises as a result of the existence of the target virtual logical volume VVOL in the respective physical storage apparatuses 3 configuring the target virtual logical volume VVOL.

(B) Store the physical storage apparatus ID of the respective physical storage apparatuses 3 configuring the target virtual logical volume VVOL detected in the foregoing add processing in the physical storage apparatus ID column 77A (FIG. 12) of a different entry of the data offset information 77, and store the corresponding total traffic, which was calculated as described above, in the total traffic column 77B (FIG. 12) of the respective entries.

(C) Calculate the total traffic of the data of the target virtual logical volume VVOL by totaling all total traffics that are stored in the total traffic column 77B of the respective entries of the data offset information 77, calculate the ratio (traffic ratio) of the respective total traffics relative to the foregoing total traffic, and store each of the calculated traffic ratios in the corresponding traffic ratio column 77C (FIG. 12) of the corresponding entry of the data offset information 77.

Subsequently, the data offset calculation unit 54 searches for an entry, among the entries of the path management table 70 (FIG. 7), in which the virtual logical volume ID stored in the virtual logical volume ID column 70A (FIG. 7) and the host computer ID stored in the host computer ID column 70B (FIG. 7) are both the same as the virtual logical volume ID and the host computer ID that are respectively received in step SP20 and step SP21, and acquires, from the path management table 70, information of that entry regarding all entries detected in the foregoing search (SP24).

Subsequently, the data offset calculation unit 54 identifies the physical storage apparatus 3 to which the access path to and from the host computer 2 is directly connected among the plurality of physical storage apparatuses 3 configuring the target virtual logical volume VVOL based on the information acquired in step SP24, stores "true" in the access path information column 77D (FIG. 12) of the entry corresponding to that physical storage apparatus 3 among the entries of the data offset information 77, and stores "false" in the access path information column 77D of the other entries (SP25).

The data offset information 77 is completed based on the processing described above. The data offset calculation unit 54 thereafter ends this data offset calculation processing.

(4-3) Access Path Search Processing

When the search button 102 of the detailed access path diagnosis screen 20 is clicked, an access path search request is sent from the management client 5 to the access path diagnostic unit 60 of the management computer 4. When the access path diagnostic unit 60 receives the access path search request, the access path diagnostic unit 60 calls the access path search unit 61, and sends, to the access path search unit 61, the access path search command, and, as arguments, the virtual logical volume ID of the targeted virtual logical volume (target virtual logical volume) VVOL and the host computer ID of the targeted host computer (target host computer) 2.

Figure 22:
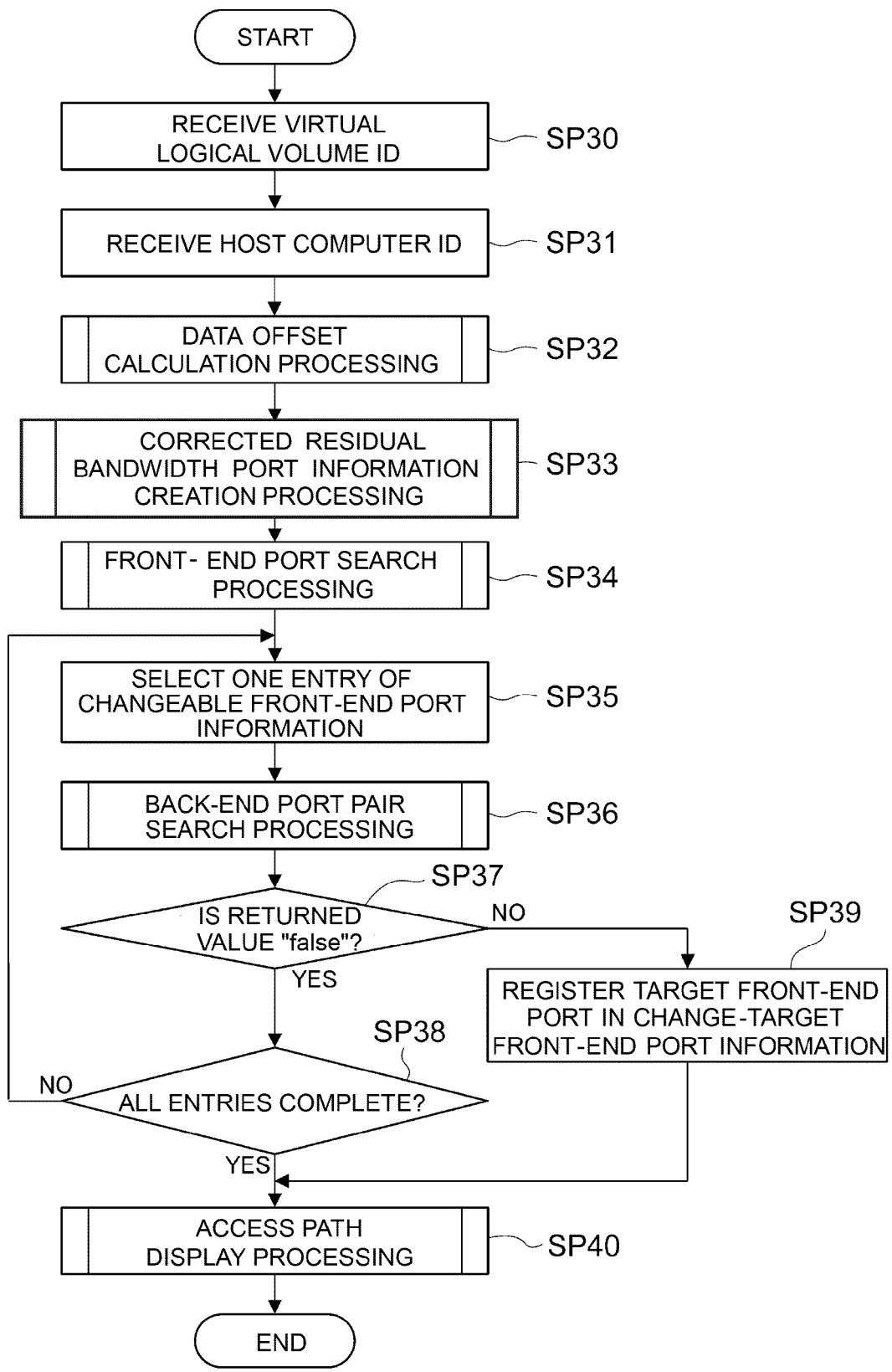
FIG. 22 is a flowchart showing the processing routine of the access path search processing.

Consequently, according to the processing routine shown in FIG. 22, the access path search unit 61 that received the access path search command searches for a path capable of becoming the change destination of the access path when the target host computer 2 is to access the target virtual logical volume VVOL.

In effect, the access path search unit 61 starts the access path search processing shown in FIG. 22 upon being called by the access path diagnostic unit 60, and foremost receives the virtual logical volume ID of the target virtual logical volume VVOL and the host computer ID of the target host computer 2 that were sent from the access path diagnostic unit 60 (SP30, SP31).

Subsequently, the access path search unit 61 calls the data offset calculation unit 54 (FIG. 6) with the virtual logical volume ID and the host computer ID received in step SP30 and step SP31 as the arguments (SP32). Consequently, the data offset calculation unit 54 that was called by the access path search unit 61 creates the data offset information 77 (FIG. 12) corresponding to the target virtual logical volume VVOL by executing the data offset calculation processing explained above with reference to FIG. 21.

Subsequently, the access path search unit 61 calls the corrected residual bandwidth port information creation unit 55 with the virtual logical volume ID and the host computer ID received in step SP30 and step SP31 as the arguments (SP33). Consequently, the corrected residual bandwidth port information creation unit 55 that was called by the access path search unit 61 calculates the residual bandwidth of the respective ports of the respective physical storage apparatuses 3 configuring the target virtual logical volume VVOL in the case where there is no data transfer to the target virtual logical volume VVOL, and creates the corrected residual bandwidth port information 78 (FIG. 13) corresponding to the target virtual logical volume VVOL based on the calculation result by executing the corrected residual bandwidth port information creation processing described later with reference to FIG. 23.

In addition, the access path search unit 61 calls the front-end port search unit 56 (FIG. 6) (SP34). Consequently, the front-end port search unit 56 that was called by the access path search unit 61 searches for the front-end port 24A to which is connected the front-end path capable of becoming the change destination of the access path to and from the host computer 2 among the respective front-end ports 24A of the respective physical storage apparatuses 3 configuring the target virtual logical volume VVOL, and creates the changeable front-end port information 79 (FIG. 14) corresponding to the target virtual logical volume VVOL based on the search result by executing the front-end port search processing described later with reference to FIG. 24.

The access path search unit 61 thereafter selects one front-end port 24A, among the front-end ports 24A that are registered in the changeable front-end port information 79 created by the front-end port search unit 56 in step SP34, of a physical storage apparatus 3 that has not yet been subject to the processing of step SP36 to step SP39 and which has the greatest total traffic (SP35).

Subsequently, the access path search unit 61 calls the back-end port pair search unit 57 with the physical storage apparatus ID of the physical storage apparatus 3 comprising the front-end port 24A selected in step SP35 as the argument (SP36). Consequently, the back-end port pair search unit 57 that was called by the access path search unit 61 executes the back-end port pair search processing described later with reference to FIG. 25.

When the connection destination of the access path from the target host computer 2 to the target virtual logical volume VVOL is switched to the physical storage apparatus 3 comprising the front-end port 24A selected in step SP35 based on this back-end port search processing, whether there is a back-end port pair to which is connected the back-end path of the inter-physical storage apparatus that can be used as the access path from that physical storage apparatus 3 to another physical storage apparatus 3 is detected. When such a back-end port pair exists, "true" is returned from the back-end port pair search unit 57 to the access path search unit 61, and, when such a back-end port pair does not exist, "false" is returned from the back-end port pair search unit 57 to the access path search unit 61.

Subsequently, the access path search unit 61 determines whether the return value from the back-end port pair search unit 57 is "false" (SP37). When the access path search unit 61 obtains a positive result in this determination, the access path search unit 61 returns to step SP35, and thereafter repeats the processing of step SP35 to step SP38 while sequentially switching the entry selected in step SP35 to an entry with smaller total traffic.

Moreover, when the access path search unit 61 obtains a negative result in the determination of step SP37, the access path search unit 61 registers the front-end port 24A corresponding to the entry of the changeable front-end port information 79 selected in step SP35 in the change-target front-end port information 80 (FIG. 15) as the front-end part that can become the change destination of the access path between the host computer 2 and the physical storage apparatus 3 to be used upon accessing the virtual logical volume VVOL that is assigned the virtual logical volume ID received in step SP30.

Based on the foregoing processing, a front-end port 24A to which is connected a path that can become the change destination of the access path connecting the host computer 2 and the virtual storage apparatus VST even when consideration is given to the residual bandwidth of the back-end port 24B is selected among the front-end ports 24A of the physical storage apparatus 3 with greater total traffic of data to be input/output to and from the target virtual logical volume VVOL (that is, the physical storage apparatus 3 that is assigning the most storage areas to the target virtual logical volume VVOL) among the physical storage apparatuses 3 configuring the corresponding virtual logical volume VVOL, and the selected front-end port 24A is registered in the change-target front-end port information 80.

The access path search unit 61 thereafter calls the access path display unit 62 with the information required for displaying the access path changing screen 110 explained above with reference to FIG. 19 as the argument (SP40). Consequently, the access path display unit 62 displays, on the management client 5, the access path changing screen 110, in which the recommended change as the change of the access path is described in the after-update status display field 112, based on the foregoing information that was sent as the argument. The access path search unit 61 thereafter ends this access path search processing.

Note that, when the access path search unit 61 was unable to obtain a positive result in step SP37 even upon executing the processing of step SP35 to step SP38 for all front-end ports 24A registered in the changeable front-end port information 79, the access path search unit 61 displays, on the management client 5, information representing that there are no options for improving the performance by changing the access path. By way of reference, it is also possible to display, on the management client 5, information representing the level of distribution of data stored in the corresponding virtual logical volume VVOL to the physical storage apparatuses 3 other than the physical storage apparatus 3 that is directly connected to the host computer 2 via the access path, make an inquiry to the user on how much data should be concentrated on the physical storage apparatus 3 that is directly connected to the host computer 2 via the access path, and migrate the data based on the user's response. Moreover, data may also be automatically migrated based on predetermined conditions. In addition, when options of the access path could not be selected due to the shortage of the residual bandwidth of the front-end port or the back-end port, information recommending the addition of the port of the physical storage apparatus 3 may also be displayed on the management client 5. The access path search unit 61 thereafter ends this access path search processing.

(4-4) Corrected Residual Bandwidth Port Information Creation Processing

Figure 23:
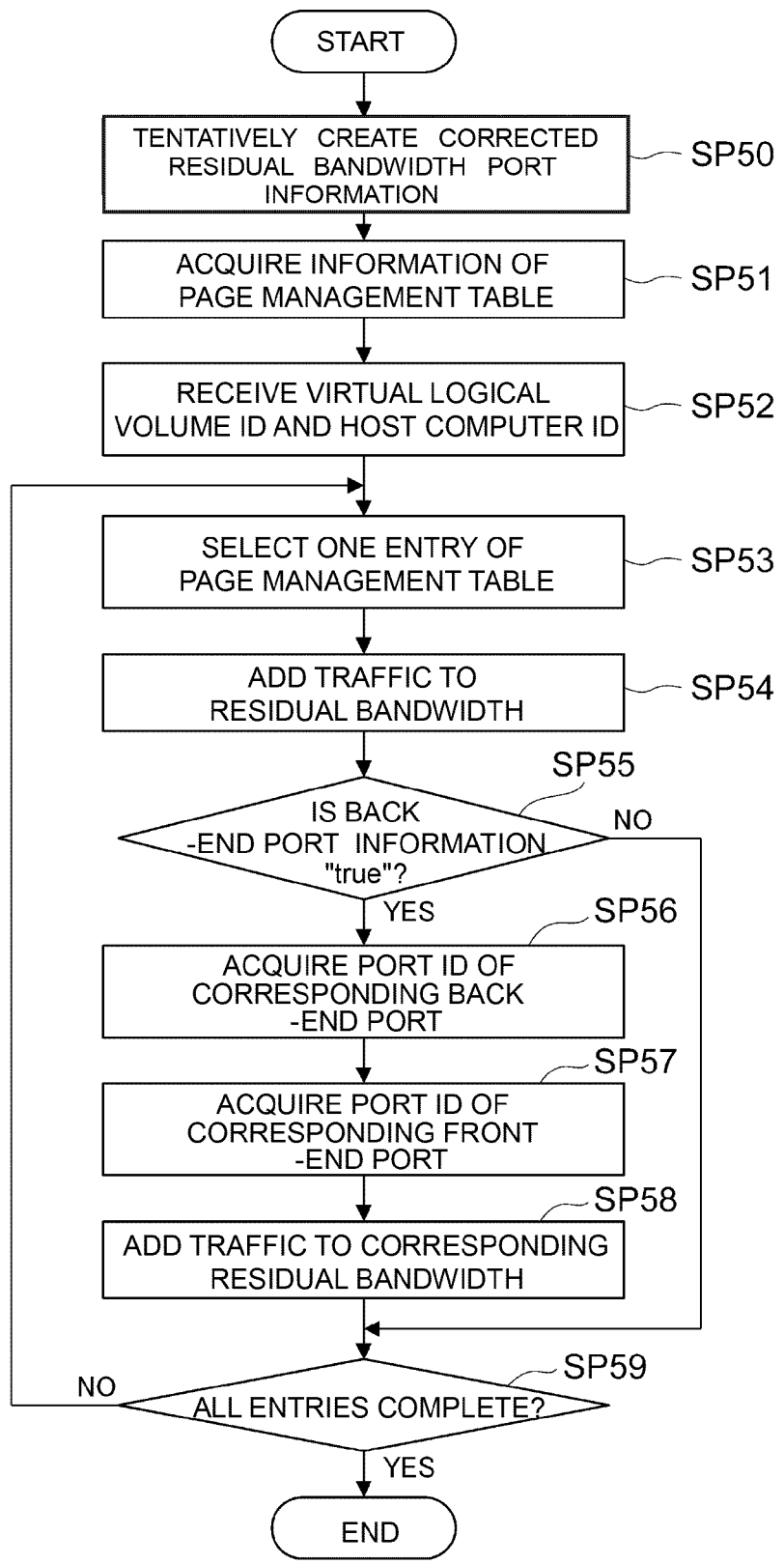
FIG. 23 is a flowchart showing the processing routine of the corrected residual bandwidth port information creation processing.

FIG. 23 shows the specific processing routine of the corrected residual bandwidth port information creation processing to be executed by the corrected residual bandwidth port information creation unit 55 that was called by the access path search unit 61 in step SP33 of the foregoing access path search processing (FIG. 22).

The corrected residual bandwidth port information creation unit 55 starts the corrected residual bandwidth port information creation processing upon being called by the access path search unit 61, and foremost tentatively creates the corrected residual bandwidth port information 78 (FIG. 13) by replicating the port management table 73 (FIG. 10) (SP50). Moreover, the corrected residual bandwidth port information creation unit 55 acquires information of all entries from the page management table 72 (FIG. 9) (SP51).

Subsequently, the corrected residual bandwidth port information creation unit 55 receives the virtual logical volume ID of the target virtual logical volume VVOL and the host computer ID of the target host computer 2 that were sent as arguments from the call source (the access path search unit 61 in this example) (SP52), and thereafter selects one entry (logical page LP) among the respective entries of the page management table 72 for which information was acquired in step SP52 (SP53).

Subsequently, the corrected residual bandwidth port information creation unit 55 searches for an entry, among the entries of the corrected residual bandwidth port information 78 tentatively created in step SP50, in which the port ID that is the same as the port ID stored in the physical storage apparatus port ID column 72G (FIG. 9) of the entry selected in step SP53 is stored in the physical storage apparatus port ID column 78B (FIG. 13), and adds the traffic stored in the traffic column 72E (FIG. 9) of the entry selected in step SP53 to the residual bandwidth stored in the residual bandwidth column 78D (FIG. 13) of the entry detected in the foregoing search (SP54). It is thereby possible to calculate the residual bandwidth of the corresponding port of the corresponding physical storage apparatus 3 in the case where there is no input/output of data to and from the target logical page (logical page corresponding to the entry selected in step SP53) of the target virtual logical volume VVOL.

The corrected residual bandwidth port information creation unit 55 thereafter determines whether "true" is stored in the back-end information column 78E (FIG. 13) of the entry, among the entries of the corrected residual bandwidth port information 78 tentatively created in step SP50, in which the port ID that is the same as the port ID stored in the physical storage apparatus port ID column 72G (FIG. 9) of the entry selected in step SP53 is stored in the physical storage apparatus port ID column 78B (FIG. 13) (SP55).

Here, to obtain a negative result in this determination means that the data stored in the logical page corresponding to the entry selected in step SP53 is being retained in the physical storage apparatus 3 in which the host computer 2 and the access path are directly connected. Consequently, in the foregoing case, the corrected residual bandwidth port information creation unit 55 proceeds to step SP58.

Meanwhile, to obtain a positive result in the determination of step SP55 means the data stored in the logical page corresponding to the entry selected in step SP53 is being retained in a physical storage apparatus 3 other than the physical storage apparatus 3 in which the host computer 2 and the access path are directly connected.

Consequently, in the foregoing case, the corrected residual bandwidth port information creation unit 55 refers to the port pair management table 74 (FIG. 11), acquires the port ID of the port configuring the back-end port pair together with the port (this is hereinafter referred to as the "target port") that is assigned the port ID stored in the physical storage apparatus port ID column 72G (FIG. 9) of the entry selected in step SP53 (SP56). Note that the port ID that is acquired in the foregoing case is the port ID of the back-end port 24B that is connected to the target port via the access path among the ports of the physical storage apparatus 3 that is directly connected to the host computer 2 via the access path.

Specifically, the corrected residual bandwidth port information creation unit 55 searches for an entry that satisfies all of the following conditions of (A) to (E) in the port pair management table 74, and acquires a port ID that is different from the port ID stored in the physical storage apparatus port ID column 72G (FIG. 9) of the entry selected in step SP53 among the port IDs stored in the physical storage apparatus port ID-A column 74B (FIG. 11) and the physical storage apparatus port ID-B column 74D (FIG. 11) of the entries detected in the foregoing search.

(A) The port ID that is the same as the port ID stored in the physical storage apparatus port ID column 72G of the entry selected in step SP53 is stored in either the physical storage apparatus port ID-A column 74B or the physical storage apparatus port ID-B column 74D.

(B) "True" is stored in the inter-physical storage apparatus port pair information column 74E (FIG. 11).

(C) "True" is stored in the access path information column 74F (FIG. 11).

(D) The virtual logical volume ID that is the same as the virtual logical volume ID received in step SP52 is stored in the virtual logical volume ID column 74G (FIG. 11).

(E) The host computer ID that is the same as the host computer ID received in step SP52 is stored in the host computer ID column 74H (FIG. 11).

Subsequently, the corrected residual bandwidth port information creation unit 55 acquires the port ID of the port connected to the host computer 2 via the access path among the ports of the physical storage apparatus 3 comprising the back-end port 24B that is assigned the port ID acquired in step SP56

(SP57). Note that the port ID that is acquired in the foregoing case is the front-end port 24A to which the access path is connected among the ports of the physical storage apparatus 3 that is directly connected to the host computer 2 via the access path.

Specifically, the corrected residual bandwidth port information creation unit 55 searches for an entry that satisfies all of the following conditions of (A) to (d) in the port pair management table 74 (FIG. 11), and acquires a port ID that is different from the port ID stored in the physical storage apparatus port ID column 72G (FIG. 9) of the entry selected in step SP53 among the port IDs stored in the physical storage apparatus port ID-A column 74B (FIG. 11) and the physical storage apparatus port ID-B column 74D (FIG. 11) of the entries detected in the foregoing search.

(A) The port ID that is the same as the port ID acquired in step SP56 is stored in either the physical storage apparatus port ID-A column 74B or the physical storage apparatus port ID-B column 74D.

(B) "True" is stored in the access path information column 74F (FIG. 11).

(C) The virtual logical volume ID that is the same as the virtual logical volume ID received in step SP52 is stored in the virtual logical volume ID column 74G (FIG. 11).

(D) The host computer ID that is the same as the host computer ID received in step SP52 is stored in the host computer ID column 74H (FIG. 11).

Subsequently, the corrected residual bandwidth port information creation unit 55 searches for an entry, among the entries of the corrected residual bandwidth port information 78 (FIG. 13), in which the port ID that is the same as the port ID acquired in step SP56 is stored in the physical storage apparatus port ID column 78B (FIG. 13), and adds the traffic stored in the traffic column 72E (FIG. 9) of the entry selected in step SP53 to the residual bandwidth stored in the residual bandwidth column 78D of the entry detected in the foregoing search (SP58). It is thereby possible to calculate the residual bandwidth of the back-end port 24B that is connected to the target port among the ports of the physical storage apparatus 3 that is connected to the host computer 2 via the access path in the case where there is no input/output of data to and from the target logical page LP.

Similarly, the corrected residual bandwidth port information creation unit 55 searches for an entry, among the entries of the corrected residual bandwidth port information 78 (FIG. 13), in which the port ID that is the same as the port ID acquired in step SP57 is stored in the physical storage apparatus port ID column 78B (FIG. 13), and adds the traffic stored in the traffic column 72E (FIG. 9) of the entry selected in step SP53 to the residual bandwidth stored in the residual bandwidth column 78D of the entry detected in the foregoing search (SP58). It is thereby possible to calculate the residual bandwidth of the front-end port 24A to which the access path is connected among the ports of the physical storage apparatus 3 that is connected to the host computer 2 via the access path in the case where there is no input/output of data to and from the target logical page LP.

The corrected residual bandwidth port information creation unit 55 thereafter determines whether the processing of step SP53 to step SP58 has been executed for all entries of the page management table 72 (FIG. 9) (SP59). When the corrected residual bandwidth port information creation unit 55 obtains a negative result in this determination, the corrected residual bandwidth port information creation unit 55 returns to step SP53, and thereafter repeats the processing of step SP53 to step SP59 until a positive result is obtained in step SP59 while switching the entry of the page management table 72 selected in step SP53 to another unprocessed entry.

Based on the foregoing processing, it is possible to complete the corrected residual bandwidth port information 78 which registers the residual bandwidth of the respective ports of the respective physical storage apparatuses 3 in the case where there is no input/output of data to and from the target virtual logical volume VVOL.

When the corrected residual bandwidth port information creation unit 55 eventually obtains a positive result in step SP59 as a result of executing the processing of step SP53 to step SP5 for all entries of the page management table 72, the corrected residual bandwidth port information creation unit 55 ends this corrected residual bandwidth port information creation processing.

(4-5) Front-End Port Search Processing

Figure 24:
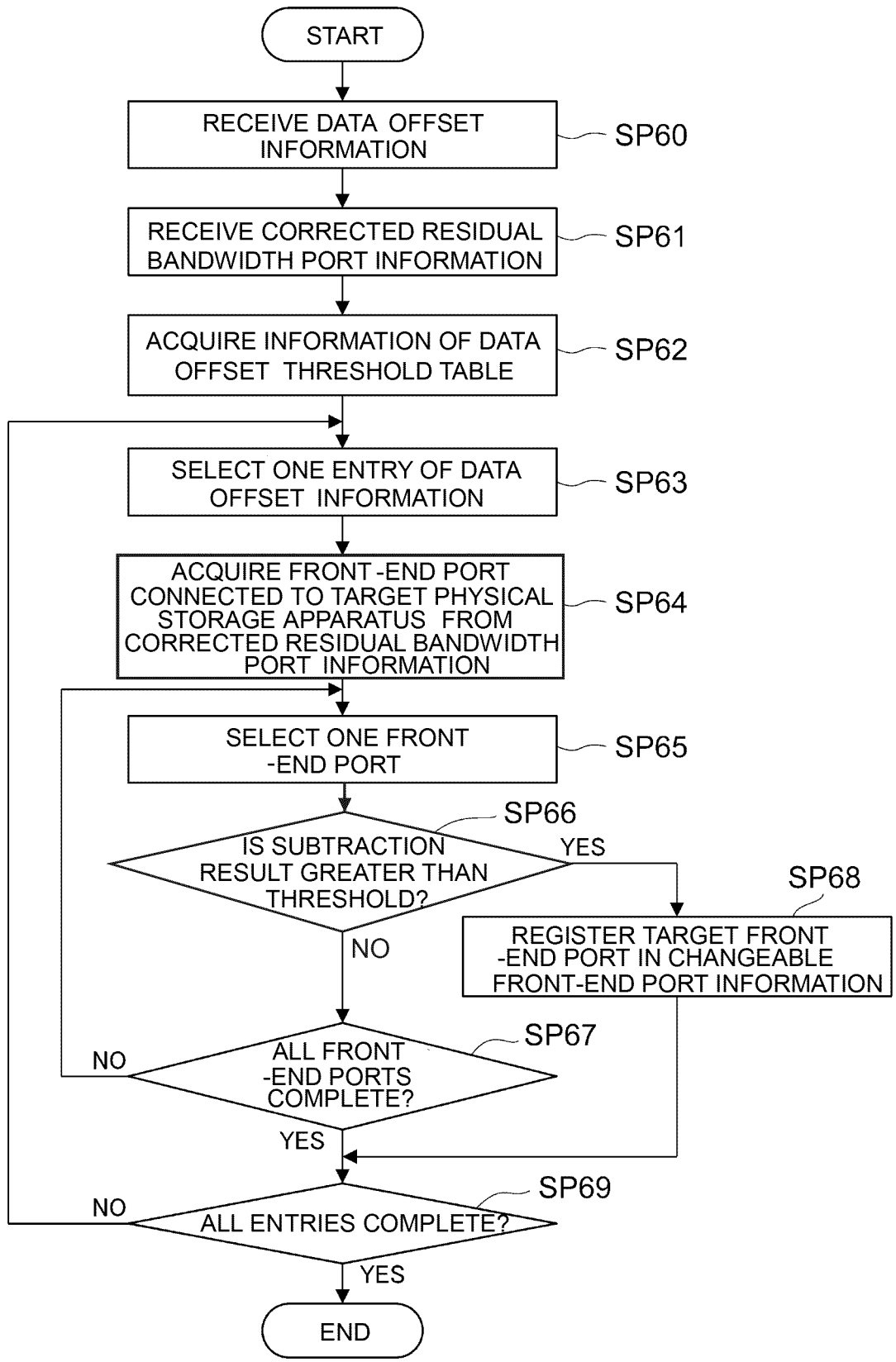
FIG. 24 is a flowchart showing the processing routine of the front-end port search processing.

FIG. 24 shows the specific processing routine of the front-end port search processing to be executed by the front-end port search unit 56 that was called by the access path search unit 61 in step SP34 of the access path search processing (FIG. 22).

The front-end port search unit 56 starts the front-end port search processing upon being called by the access path search unit 61, and foremost sequentially acquires the data offset information 77 (FIG. 12), corrected residual bandwidth port information 78 (FIG. 13) and the data offset threshold and the unused port bandwidth threshold stored in the data offset threshold management table 75 (SP60 to SP62).

Subsequently, the front-end port search unit 56 selects one entry among the entries of the data offset information 77 acquired in step SP60 (SP63), searches for an entry, among the entries of the corrected residual bandwidth port information 78, corresponding to each of the front-end ports 24A of the physical storage apparatus 3 corresponding to the entry selected in step SP63, and acquires information of all corresponding entries from the corrected residual bandwidth port information 78 (SP64).

Specifically, the front-end port search unit 56 searches for an entry that satisfies both of the following conditions of (A) and (B) among the entries of the corrected residual bandwidth port information 78, and acquires information of all corresponding entries from the corrected residual bandwidth port information 78.

(A) The physical storage apparatus ID that is the same as the physical storage apparatus ID stored in the physical storage apparatus ID column 77A (FIG. 12) of the entry of the data offset information 77 selected in step SP63 is stored in the physical storage apparatus ID column 78A (FIG. 13).

(B) "False" is stored in the back-end port information column 78E (FIG. 13).

Subsequently, the front-end port search unit 56 selects one entry among the entries of the corrected residual bandwidth port information 78 that were detected in the search of step SP64 (SP65).

The front-end port search unit 56 thereafter determines whether the value obtained by subtracting the total traffic of the physical storage apparatus 3 corresponding to the entry of the data offset information 77 selected in step SP63 from the residual bandwidth of the front-end port 24A corresponding to the entry of the corrected residual bandwidth port information 78 selected in step SP65 is greater than the unused port bandwidth threshold (SP66). This determination is made by acquiring the total traffic stored in the total traffic column 77B (FIG. 12) of the entry of the data offset information 77 selected in step SP63, subtracting the acquired total traffic from the residual bandwidth stored in the residual bandwidth column 78D (FIG. 13) of the entry selected in step SP65, and determining whether the subtracted result is greater than the unused port bandwidth threshold.

When the front-end port search unit 56 obtains a negative result in this determination, the front-end port search unit 56 determines whether the processing of step SP66 has been executed for all entries that were detected in the search of step SP64 (SP67). Moreover, when the front-end port search unit 56 obtains a negative result in this determination, the front-end port search unit 56 returns to step SP65, and thereafter repeats the processing of step SP65 to step SP67 until a positive result is obtained in step SP66 or step SP67.

When the front-end port search unit 56 obtains a positive result in step SP67 without obtaining a positive result in step SP66 with regard to the front-end port 24A corresponding to each of the entries detected in the search of step SP64, the front-end port search unit 56 proceeds to step SP69.

Meanwhile, when the front-end port search unit 56 obtains a positive result in the determination of step SP66 with regard to one of the front-end ports 24A corresponding to each of the entries detected in the search of step SP64, the front-end port search unit 56 registers that front-end port 24A in the changeable front-end port information 79 (FIG. 14) (SP68), and thereafter proceeds to step SP69.

Upon proceeding to step SP69, the front-end port search unit 56 determines whether the processing of step SP63 to step SP68 has been executed for all entries of the data offset information 77 (SP69). When the front-end port search unit 56 obtains a negative result in this determination, the front-end port search unit 56 returns to step SP63, and thereafter repeats the processing of step SP63 to step SP69 while sequentially switching the entry selected in step SP63 to another unprocessed entry.

Based on the foregoing processing, among the respective front-end ports 24A of the respective physical storage apparatuses 3 configuring the target virtual logical volume VVOL, the front-end ports 24A having a residual bandwidth which enables the access path to become the change destination will be sequentially registered in the changeable front-end port information 79.

When the front-end port search unit 56 obtains a positive result in step SP69 as a result of executing the processing of step SP63 to step SP68 for all entries of the data offset information 77, the front-end port search unit 56 ends this front-end port search processing.

(4-6) Back-End Port Pair Search Processing

Figure 25:
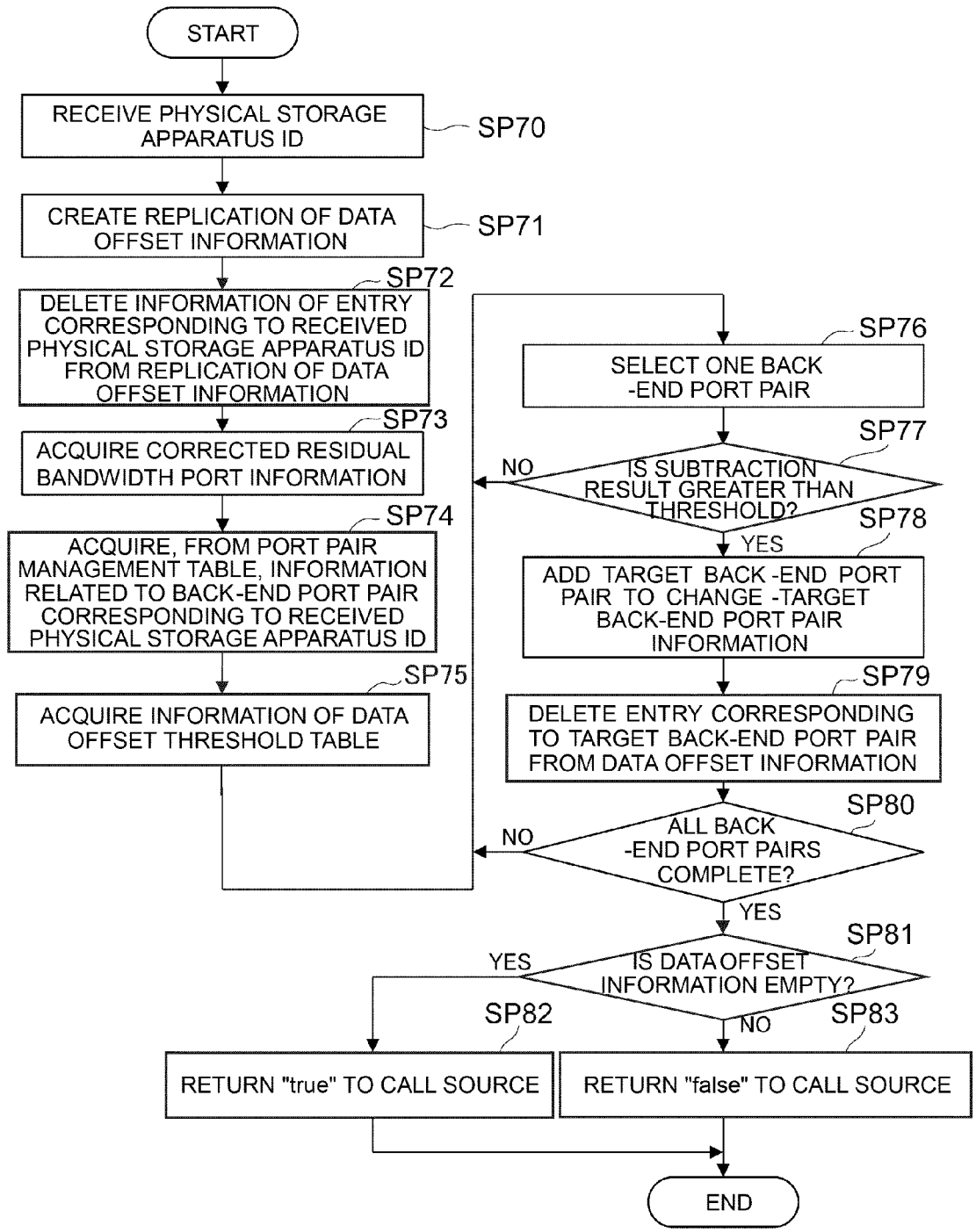
FIG. 25 is a flowchart showing the processing routine of the back-end port pair search processing.

FIG. 25 shows the specific processing routine of the back-end port pair search processing to be executed by the back-end port pair search unit 57 that was called by the access path search unit 61 in step SP36 of the access path search processing (FIG. 22).

The back-end port pair search unit 57 starts the back-end port pair search processing upon being called by the access path search unit 61, and foremost receives the physical storage apparatus ID that was sent as an argument from the call source (the access path search unit 61 in this example) (SP70).

Subsequently, the back-end port pair search unit 57 creates the replication of the data offset information 77 (FIG. 12) (SP71), and deletes the entry, among the entries in the created replication of the data offset information 77, in which the physical storage apparatus ID that is the same as the physical storage apparatus ID received in step SP70 is stored in the physical storage apparatus ID column 77A (FIG. 12) (SP72).

The back-end port pair search unit 57 thereafter acquires the corrected residual bandwidth port information 78 (SP73). Moreover, the back-end port pair search unit 57 refers to the port pair management table 74 (FIG. 11) and searches, from the port pair management table 74, for the entry related to the back-end port 24B (FIG. 3) of the physical storage apparatus 3 that is assigned the physical storage apparatus ID received in step SP70, and acquires the information of all entries that were detected in the foregoing search (SP74). Specifically, the back-end port search unit 57 acquires information of entries that satisfy both of the following two conditions among the entries of the port pair management table 74.

(A) The physical storage apparatus ID that is the same as the physical storage apparatus ID received in step SP70 has been stored in either the physical storage apparatus port ID-A column 74B or the physical storage apparatus port-B column 74D.

(B) "True" is stored in the inter-physical storage apparatus port pair information column 74E (FIG. 11).

Subsequently, the back-end port pair search unit 57 acquires the unused port bandwidth threshold from the data offset threshold management table 75 (SP75), and thereafter selects one entry among the entries of the port pair management table 74 that were detected in the search of step SP74 (SP76).

Subsequently, the back-end port pair search unit 57 determines, with regard to the two back-end ports 24B (FIG. 3) configuring the back-end port pair corresponding to the entry selected in step SP76, whether either residual bandwidth of the two back-end ports 24B will become greater than the unused port bandwidth value threshold when the physical storage apparatus 3 that is assigned the physical storage apparatus ID received in step SP70 is directly connected to the host computer 2 (SP77).

Specifically, the back-end port pair search unit 57 searches, with regard to the entries of the port pair management table 74 selected in step SP76 among the entries of the corrected residual bandwidth port information 78 (FIG. 13) acquired in step SP73, for an entry in which the physical storage apparatus ID and the physical storage apparatus port ID that are the same as the physical storage apparatus ID and the physical storage apparatus port ID respectively stored in the physical storage apparatus ID-A column 74A (FIG. 11) and the physical storage apparatus port ID-A column 74B (FIG. 11) are respectively stored in the physical storage apparatus ID column 78A (FIG. 13) and the physical storage apparatus port ID column 78B (FIG. 13), and acquires the residual bandwidth stored in the residual bandwidth column 78D (FIG. 13) of that entry. Moreover, the back-end port pair search unit 57 searches for an entry, among the entries of the replication of the data offset information 77 for which the information of one entry was deleted in step SP72, in which the physical storage apparatus ID stored in the foregoing physical storage apparatus ID-A column 74A (FIG. 11) is stored in the physical storage apparatus ID column 77A (FIG. 12), and acquires the total traffic that is stored in the total traffic column 77B (FIG. 12) of that entry. Subsequently, the back-end port pair search unit 57 subtracts the foregoing total traffic from the foregoing residual bandwidth, and determines whether the subtracted result is greater than the unused port bandwidth threshold (first determination).

Similarly, the back-end port pair search unit 57 searches, with regard to the entries of the port pair management table 74 selected in step SP76 among the entries of the corrected residual bandwidth port information 78 (FIG. 13) acquired in step SP73, for an entry in which the physical storage apparatus ID and the physical storage apparatus port ID that are the same as the physical storage apparatus ID and the physical storage apparatus port ID respectively stored in the physical storage apparatus ID-B column 74C (FIG. 11) and the physical storage apparatus port ID-B column 74D (FIG. 11) are respectively stored in the physical storage apparatus ID column 78A (FIG. 13) and the physical storage apparatus port ID column 78B (FIG. 13), and acquires the residual bandwidth stored in the residual bandwidth column 78D (FIG. 13) of that entry. Moreover, the back-end port pair search unit 57 searches for an entry, among the entries of the replication of the data offset information 77 for which the information of one entry was deleted in step SP72, in which the physical storage apparatus ID stored in the foregoing physical storage apparatus ID-B column 74C (FIG. 11) is stored in the physical storage apparatus ID column 77A (FIG. 12), and acquires the total traffic that is stored in the total traffic column 77B (FIG. 12) of that entry. Subsequently, the back-end port pair search unit 57 subtracts the foregoing total traffic from the foregoing residual bandwidth, and determines whether the subtracted result is greater than the unused port bandwidth threshold (second determination).

When the back-end port pair search unit 57 obtains a negative result in at least one of the foregoing first and second determinations (SP77: NO), the back-end port pair search unit 57 returns to step SP76, and thereafter repeats the processing of step SP76 onward while sequentially switching the entry selected in step SP76 to another entry.

Meanwhile, when the back-end port pair search unit 57 obtains a positive result in both the first and second determinations (SP77: YES), the back-end port pair search unit 57 additionally registers, in the change-target back-end port pair information 81 (FIG. 16), the back-end port pair corresponding to the entry selected in step SP76 (SP78).

The back-end port pair search unit 57 thereafter deletes the entry corresponding to the back-end port pair from the replication of the data offset information 77 (SP79). Specifically, the back-end port pair search unit 57 deletes an entry, among the entries of the replication of the data offset information 77, in which the physical storage apparatus ID that is the same as the physical storage apparatus ID stored in either the physical storage apparatus ID-A column 74A (FIG. 11) or the physical storage apparatus ID-B column 74C (FIG. 11) of the entry selected in step SP76 is stored in the physical storage apparatus ID column 77A (FIG. 12).

In addition, the back-end port pair search unit 57 determines whether the processing of step SP76 to step SP79 has been executed for all entries that were detected in the search of step SP74 (SP80). When the back-end port pair search unit 57 obtains a negative result in this determination, the back-end port pair search unit 57 returns to step SP76, and thereafter repeats the processing of step SP76 to step SP80 until a positive result is obtained in step SP80 while sequentially switching the entry selected in step SP76 to another unprocessed entry.

Based on the foregoing processing, the back-end port pairs, among the back-end port pairs configured by the back-end ports 24B of the physical storage apparatus 3 comprising the front-end port 24A registered in the changeable front-end port information 79, in which both the residual bandwidth of the back-end port 24B of the physical storage apparatus 3 and the residual bandwidth of the back-end port 24B of another physical storage apparatus 3 configuring the back-end port pair together with that back-end port 24B, will be sequentially registered in the change-target back-end port pair information 81 even when the access path to and from the host computer 2 is changed to the front-end port 24A of the physical storage apparatus 3.

When the back-end port pair search unit 57 eventually obtains a positive result in step SP80 as a result of executing the processing of step SP76 to step SP79 for all entries that were searched in step SP74, the back-end port pair search unit 57 determines whether the data offset information 77 is now empty (SP81).

To obtain a positive result in this determination means that there is a back-end port pair registered in the change-target back-end port pair information 81. Consequently, in the foregoing case, the back-end port pair search unit 57 returns "true" to the access path search unit 61 as the call source (SP82), and thereafter ends this back-end port pair search processing.

Meanwhile, to obtain a negative result in the determination of step SP81 means that there is no back-end port pair registered in the change-target back-end port pair information 81. Consequently, in the foregoing case, the back-end port pair search unit 57 returns "false" to the access path search unit 61 as the call source (SP83), and thereafter ends this back-end port pair search processing.

(4-7) Access Path Display Processing

Figure 26:
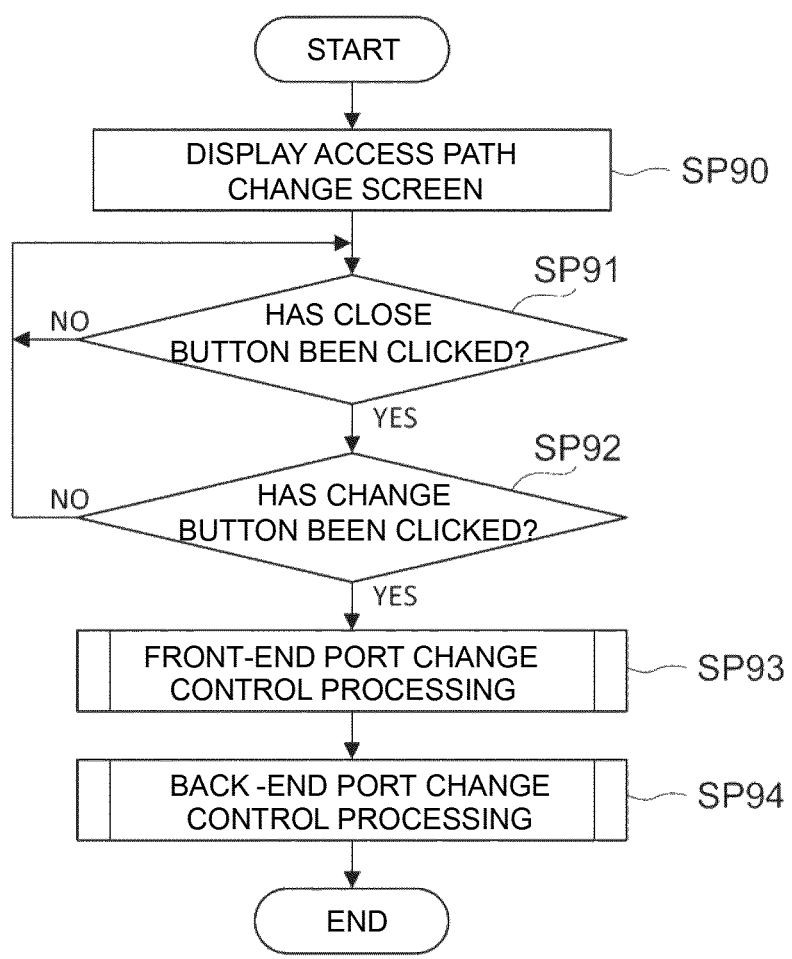
FIG. 26 is a flowchart showing the processing routine of the access path display processing.

FIG. 26 shows the specific processing routine of the access path display processing to be executed by the access path display unit 62 (FIG. 6) that was called by the access path search unit 61 in step SP40 of the access path search processing (FIG. 22).

The access path display unit 62 starts the access path display processing upon being called by the access path search unit 61, and foremost sends, to the management client 5, the data required for displaying the access path changing screen 110 explained above with reference to FIG. 19 based on the change-target front-end port information 80 (FIG. 15) and the change-target back-end port pair information 81 (FIG. 16). The access path changing screen 110 based on this data is thereby displayed on the management client 5.

Subsequently, the access path display unit 62 waits for the close button 114 (FIG. 19) or the change button 113 (FIG. 19) on the access path changing screen 110 to be clicked (SP91, SP92). Subsequently, the access path display unit 62 commands the management client 5 to close the access path changing screen 110 when the close button 114 is clicked, and thereafter ends this access path display processing.

Meanwhile, when the change button 113 is clicked, the access path display unit 62 commands the front-end port change control unit 58 (FIG. 6) to switch the access path from the host computer 2 to the corresponding virtual logical volume VVOL to the access path displayed on the after-update status display field 112 (FIG. 19) of the access path changing screen 110 that is being displayed on the management client 5 at such time (SP93).

Consequently, the front-end port change control unit 58 that received the foregoing command commands the host computer 2 to change the access destination upon accessing the corresponding virtual logical volume VVOL to the front-end port 24A that is assigned the physical storage apparatus port ID stored in the physical storage apparatus port ID column 80B (FIG. 15) of the corresponding entry of the change-target front-end port information 80 (FIG. 15), and additionally updates the path management table 70 (FIG. 7). Moreover, in accordance with the foregoing command, the host computer 2 updates the path management table 17 (FIG. 2) in the own apparatus so as to change the access destination upon accessing the foregoing virtual logical volume VVOL to the front-end port 24A that is assigned the physical storage apparatus port ID.

Subsequently, the access path display unit 62 commands the back-end port change control unit 59 to switch, with regard to the corresponding virtual logical volume VVOL, the access path between the respective physical storage apparatuses 3 to the access path displayed in the after-update status display field 112 (FIG. 19) of the access path changing screen 110 that is being displayed on the management client 5 at such time (SP94).

Consequently, the back-end port change control unit 59 that received the foregoing command commands the physical storage apparatus 3 to change, with regard to the corresponding virtual logical volume VVOL, the access path between the respective physical storage apparatuses 3 to the path connecting the back-end port 24B that is assigned the port ID stored in the physical storage apparatus port ID-A column 81B of the corresponding entry of the change-target back-end port pair information 81 (FIG. 16) and the back-end port 24B that is assigned the port ID stored in the physical storage apparatus port ID-A column 81D, and additionally updates the path management table 70 (FIG. 7). Moreover, in accordance with the foregoing command, the respective physical storage apparatuses 3 that received the foregoing command updates the path management table 17 not shown in the own apparatus so as to change the access path to and from another physical storage apparatus 3 to the back-end port 24B that is assigned the designated port ID.

The access path display unit thereafter ends this access path display processing.

(4-8) Access Path Automatic Change Processing

While the various types of processing explained above with reference to FIG. 20A to FIG. 26 are for changing the access path according to the operations performed by the system administrator, the computer system 1 according to this embodiment is also provided with an operation mode of automatically changing the access path according to changes in the I/O tendency (this is hereinafter referred to as the "access path automatic change mode").

Figure 27:
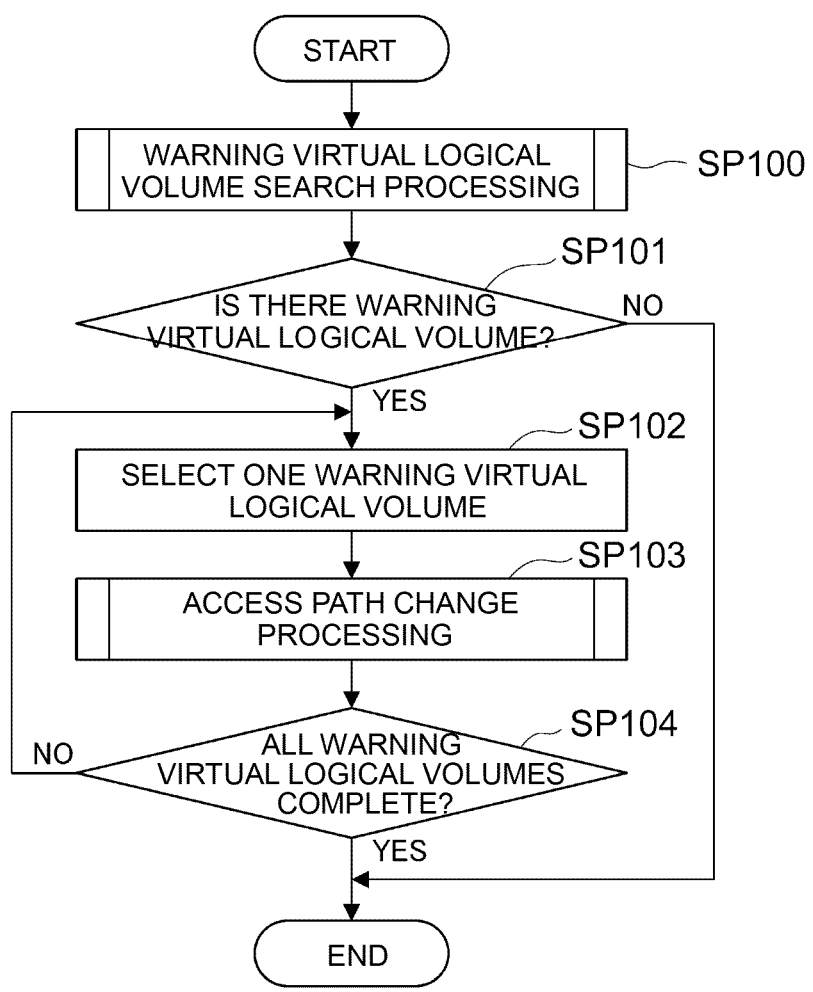
FIG. 27 is a flowchart showing the processing routine of the access path automatic change processing.

FIG. 27 shows the processing routine of the access path automatic change processing to be executed by the access path diagnostic unit 60 (FIG. 6) of the management computer 4 when the access path automatic change mode has been set in that management computer 4.

The access path diagnostic unit 60 is activated at a predetermined timing (for instance, periodically by a timer according to a scheduling setting), or after the host computer information collection unit 50 collects the required information from the host computer 2, or the storage apparatus information collection unit 51 collects the required information from the respective physical storage apparatuses in cases where the access path automatic change mode has been set, and foremost executes the warning virtual logical volume search processing of searching for a virtual logical volume (warning virtual logical volume) VVOL in which there is a problem with the access path from the host computer 2 (SP100).

Subsequently, the access path diagnostic unit 60 determines whether a warning virtual logical volume VVOL was detected in the search of step SP100 (SP101). When the access path diagnostic unit 60 obtains a negative result in this determination, the access path diagnostic unit 60 ends this access path automatic change processing.

Meanwhile, when the access path diagnostic unit 60 obtains a positive result in the determination of step SP101, the access path diagnostic unit 60 selects one warning virtual logical volume VVOL among the warning virtual logical volumes VVOL that were detected in the search of step SP100 (SP102).

The access path diagnostic unit 60 thereafter calls the access path search unit 61 (FIG. 6) with the virtual logical volume ID of the warning virtual logical volume VVOL selected in step SP102 and the host computer ID of the host computer 2 capable of accessing that warning virtual logical volume VVOL as the arguments (SP103). Consequently, the access path search unit 61 that was called by the access path diagnostic unit 60 executes the access path change processing of changing the access path between the host computer 2 and the physical storage apparatus 3 or the access path in the physical storage apparatuses 3 or between the physical storage apparatuses 3 to an optimal access path.

The access path diagnostic unit 60 thereafter determines whether the processing of step SP103 has been executed for all warning virtual logical volumes VVOL that were detected in the search of step SP100 (SP104). When the access path diagnostic unit 60 obtains a negative result in this determination, the access path diagnostic unit 60 returns to step SP102, and thereafter repeats the processing of step SP102 to step SP104 while sequentially switching the warning virtual logical volume VVOL selected in step SP102 to another unprocessed warning virtual logical volume VVOL.

When the access path diagnostic unit 60 eventually obtains a positive result in step SP104 as a result of finishing the processing of step SP103 for all warning virtual logical volumes VVOL that were detected in the search of step SP100, the access path diagnostic unit 60 ends this access path automatic change processing.

Figure 28:
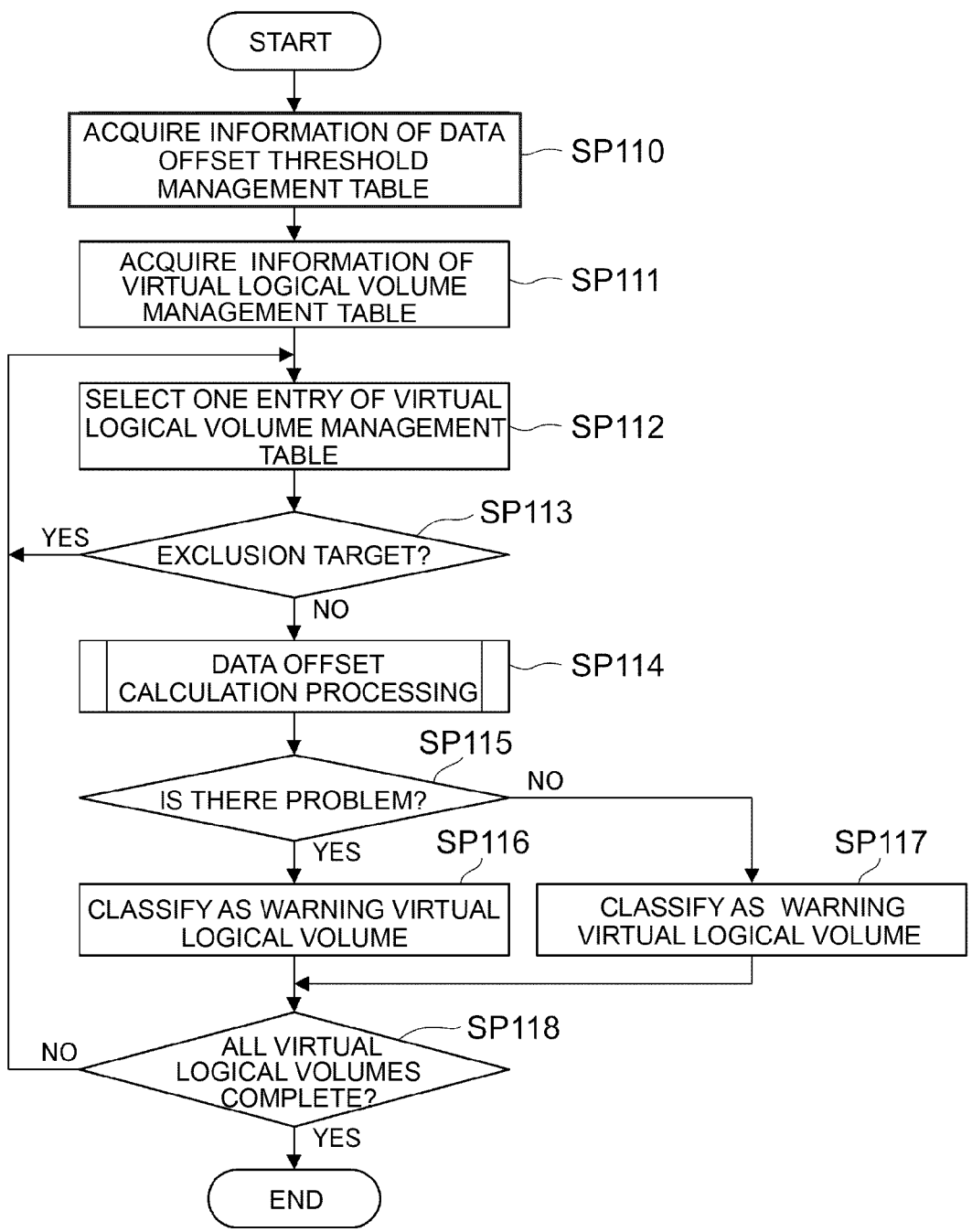
FIG. 28 is a flowchart showing the processing routine of the warning virtual logical volume search processing.

The specific processing routine of the warning virtual logical volume search processing to be executed by the access path diagnostic unit 60 in step SP100 of the access path automatic change processing (FIG. 27) is shown in FIG. 28. Since the processing of step SP110 to step SP118 of the warning virtual logical volume search processing is the same as the processing of step SP1 to step SP9 of the access path diagnosis processing explained above with reference to FIG. 20A, the detailed explanation thereof is omitted.

Moreover, the specific processing routine of the access path change processing to be executed by the access path search unit 61 that was called by the access path diagnostic unit 60 in step SP103 of the access path automatic change processing (FIG. 27) is shown in FIG. 29.

When the access path search unit 61 is called by the access path diagnostic unit 60 in a state in which the access path automatic change mode has been set, the access path search unit 61 starts the access path change processing shown in FIG. 29, and performs the processing of step SP120 to step SP128 in the same manner as the processing of step SP30 to step SP38 of the access path search processing explained above with reference to FIG. 22. Thereby created are the changeable front-end port information 79 (FIG. 14) which registers the front-end port 24A capable of becoming the change destination of the access path from the host computer 2, and the change-target back-end port pair information 81 (FIG. 16) which registers the pair (back-end port pair) of the back-end port 24B to which is connected the back-end path capable of becoming the change destination of the access path in the physical storage apparatuses 3 and between the physical storage apparatuses 3.

Subsequently, the access path search unit 61 performs the processing of step SP130 and step SP131 in the same manner as the processing of step SP93 and step SP94 of the access path display processing explained above with reference to FIG. 26. It is thereby possible to switch the access path between the host computer 2 and the physical storage apparatus 3 and the access path in the physical storage apparatuses 3 and between the physical storage apparatuses 3 based on the changeable front-end port information 79 and the change-target back-end port pair information 81 created in step SP120 to step SP128.

(5) Effect of this Embodiment

According to the computer system 1 of this embodiment configured as described above, with regard to a virtual logical volume VVOL in which there is a problem with the access path, the access path from the host computer 2 to that virtual logical volume VVOL can be changed to a path that is connected to a physical storage apparatus 3 with greater total traffic of data that is input/output to and from that virtual logical volume VVOL (that is, the physical storage apparatus 3 that is assigning more storage area to that virtual logical volume VVOL and retaining more data stored in that virtual logical volume VVOL).

Accordingly, as a result of changing the access path from the host computer 2 to the virtual logical volume VVOL to the physical storage apparatus 3 described above, it is possible to reduce the data transfer between the physical storage apparatuses 3 upon accessing the virtual logical volume VVOL from the host computer 2, thereby improve the access speed upon accessing the virtual logical volume VVOL from the host computer 2, and consequently improve the access performance to the data stored in the virtual logical volume VVOL from the host computer 2 in the computer system 1.

(6) Other Embodiments

Note that, while the foregoing embodiment explained a case of individually providing the management computer 4 and the management client 5, the present invention is not limited thereto, and the management computer 4 and the management client 5 may be configured as a single device.

Moreover, while the foregoing embodiment explained a case of configuring the access path diagnostic unit that determines whether a ratio of an access volume used by the path connecting the physical storage apparatuses 3 exceeds a predetermined ratio, the change destination path identification unit that identifies the path of the change destination of the access path when the ratio of the access volume exceeds the predetermined ratio, the access path change unit that executes predetermined control processing for changing the path identified by the change destination path identification unit to be a part of the access path from the host computer 2 to the virtual logical volume VVOL, and the access path display unit that displays, or causes another device to display, the access paths from the host computer 2 to the virtual logical volume VVOL including the path identified by the change destination path identification unit from the various program modules and the CPU 30 of the management computer 4, the present invention is not limited thereto, and the access path diagnostic unit, the change destination path identification unit, the access path change unit and the access path display unit may also be respectively configured from individual devices.

In addition, while the foregoing embodiment explained a case of determining that there is a problem with the access from the host computer 2 to the corresponding virtual logical volume VVOL when at least one of the three conditions of (A) to (C) explained above with reference to step SP6 of the access path diagnosis processing (FIG. 20A and FIG. 20B) is satisfied, the present invention is not limited thereto, and, for example, it is also possible to store the threshold of the ratio of the access volume of using the path in the data offset threshold table 75 (FIG. 6) in advance, and determine that there is a problem with the access path from the host computer 2 to the virtual logical volume VVOL when the access volume of using that path exceeds the foregoing threshold. In the foregoing case, the entire configuration of this embodiment described above can be applied other than the foregoing configuration.

In addition, while the foregoing embodiment explained a case of the management computer 4 displaying the access path diagnosis screen, the detailed access path diagnosis screen and the access path changing screen on the management client 5, the present invention is not limited thereto, and, for example, these screens may also be displayed on the management computer 4, or displayed on devices other than the management client 5.

INDUSTRIAL APPLICABILITY

The present invention can be broadly applies to computer systems that manages storage areas respectively provided by a plurality of storage apparatuses as a logical pool, provides to a host computer a virtual volume that is associated with the logical pool, and dynamically assigns a storage area from the logical volume to the virtual volume.

REFERENCE SIGNS LIST

1 . . . computer system, 2 . . . host computer, 3 . . . physical storage apparatus, 4 . . . management computer, 5 . . . management client, 6 . . . host communication SAN, 7 . . . inter-apparatus communication SAN, 24A . . . SAN port (front-end port), 24B . . . SAN port (back-end port), 23 . . . physical storage device, 30 . . . CPU, 31 . . . memory, 40 . . . control program, 41 . . . control data, 90 . . . access path diagnosis screen, 100 . . . detailed access path diagnosis screen, 110 . . . access path changing screen, PL . . . apparatus transverse pool, VOL . . . logical volume, VVOL . . . virtual logical volume.

The invention claimed is:

1. A management apparatus for managing a computer system in which a plurality of storage apparatuses are connected to each other, wherewith the computer system manages storage areas respectively provided by a first storage apparatus and a second storage apparatus included in the plurality of storage apparatuses as a logical pool that extends over the plurality of storage apparatuses, provides to a host computer a virtual logical volume that is associated with the logical pool, and dynamically assigns a storage area from the logical volume to the virtual logical volume according to usage of the virtual logical volume, wherein the host computer:
is connected to the first storage apparatus via a first path, and accesses the virtual logical volume via the first path, and
accesses the first storage apparatus when access-target data exists in the first storage apparatus, and accesses the second storage apparatus via a second path connecting the first storage apparatus and the second storage apparatus when access-target data exists in the second storage apparatus, wherein the host computer comprises:
an access path diagnostic unit that determines whether a ratio of an access volume used by the second path exceeds a predetermined ratio, and determines that there is a problem with the access path from the host computer to the virtual logical volume i) when a residual bandwidth of a front-end port of the first storage apparatus to which the first access path is connected is less than an unused port bandwidth threshold; or ii) when a residual bandwidth of a back-end port of the first storage apparatus to which the second access path is connected between the first storage apparatus and the second storage apparatus is less than the unused port bandwidth threshold;
a change destination path identification unit that identifies a third path connecting the host computer and the second storage apparatus as a change destination of the access path when it is determined that there is a problem with the access path; and an access path change unit that executes predetermined control processing for changing the third path identified by the change destination path identification unit to be a part of the access path from the host computer to the virtual logical volume in substitute for the first path.

2. The management apparatus according to claim 1, wherein the change destination path identification unit identifies, as the change destination of the access path, the third path that is connected to the second storage apparatus with greater total traffic of data to be input/output to and from the virtual logical volume.

3. The management apparatus according to claim 1, wherein there are a plurality of second paths as the second path connecting the first storage apparatus and the second storage apparatus, wherein the change destination path identification unit identifies one of the second paths among the plurality of second paths as the change destination of the access path based on a residual bandwidth of each of the second paths in the case of changing the third path identified by the change destination path identification unit to be a part of the access path, and wherein the access path change unit executes predetermined control processing for changing the second path identified by the change destination path identification unit to be a part of the access path from the host computer to the virtual logical volume.

4. The management apparatus according to claim 3, further comprising:

an access path display unit that displays, or causes another device to display, the access paths from the host computer to the virtual logical volume including the second and third paths identified by the change destination path identification unit.

5. The management apparatus according to claim 4, wherein the access path display unit displays, or causes the other device to display, together with the access paths, a residual bandwidth of a first port to which is connected the third path in the corresponding second storage apparatus and a residual bandwidth of a second port to which is connected the second path in the corresponding second storage apparatus in the case of changing a part of the access path from the host computer to the virtual logical volume to the second and third paths identified by the access path identification unit.

6. A management method that is executed in a management apparatus for managing a computer system in which a plurality of storage apparatuses are connected to each other, wherewith the computer system manages storage areas respectively provided by a first storage apparatus and a second storage apparatus included in the plurality of storage apparatuses as a logical pool that extends over the plurality of storage apparatuses, provides to a host computer a virtual logical volume that is associated with the logical pool, and dynamically assigns a storage area from the logical volume to the virtual logical volume according to usage of the virtual logical volume, wherein the host computer:

is connected to the first storage apparatus via a first path, and accesses the virtual logical volume via the first path, and accesses the first storage apparatus when access-target data exists in the first storage apparatus, and accesses the second storage apparatus via a second path connecting the first storage apparatus and the second storage apparatus when access-target data exists in the second storage apparatus, wherein the host computer comprises:

a first step of the management apparatus determining whether a ratio of an access volume used by the second path exceeds a predetermined ratio;

a second step of the management apparatus determining that there is a problem with the access path from the host computer to the virtual logical volume i) when a residual bandwidth of a front-end port of the first storage apparatus to which the first access path is connected is less than an unused port bandwidth threshold; or ii) when a residual bandwidth of a back-end port of the first storage apparatus to which the second access path is connected between the first storage apparatus and the second storage apparatus is less than the unused port bandwidth threshold, and identifying a third path connecting the host computer and the second storage apparatus as a change destination of the access path; and a third step of the management apparatus executing predetermined control processing for changing the identified third path identified to be a part of the access path from the host computer to the virtual logical volume in substitute for the first path.

7. The management method according to claim 6, wherein, in the second step, the management apparatus identifies, as the change destination of the access path, the third path that is connected to the second storage apparatus with greater total traffic of data to be input/output to and from the virtual logical volume.

8. The management method according to claim 6, wherein there are a plurality of second paths as the second path connecting the first storage apparatus and the second storage apparatus, wherein, in the second step, the management apparatus identifies one of the second paths among the plurality of second paths as the change destination of the access path based on a residual bandwidth of each of the second paths in the case of changing the identified third path to be a part of the access path, and wherein, in the third step, the management apparatus executes predetermined control processing for changing the identified second path to be a part of the access path from the host computer to the virtual logical volume.

9. The management method according to claim 8, wherein, in the second step, the management apparatus displays, or causes another device to display, the access paths from the host computer to the virtual logical volume including the identified second and third paths.

10. The management method according to claim 9, wherein, in the second step, the management apparatus displays, or causes the other device to display, together with the access paths, a residual bandwidth of a first port to which is connected the third path in the corresponding second storage apparatus and a residual bandwidth of a second port to which is connected the second path in the corresponding second storage apparatus in the case of changing a part of the access path from the host computer to the virtual logical volume to the identified second and third paths.

11. The management apparatus according to claim 1, wherein the unused port bandwidth threshold is a predetermined lower limit value of an unused bandwidth of a port in a storage apparatus.

12. The management method according to claim 6, wherein the unused port bandwidth threshold is a predetermined lower limit value of an unused bandwidth of a port in a storage apparatus.

* * * * *